United States Patent
Mei et al.

(10) Patent No.: US 11,082,332 B2
(45) Date of Patent: Aug. 3, 2021

(54) LINK GROUP CONFIGURATION METHOD AND DEVICE

(71) Applicant: Huawei Technologies Co., Ltd., Shenzhen (CN)

(72) Inventors: Li Mei, Shenzhen (CN); Qiwen Zhong, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 77 days.

(21) Appl. No.: 16/665,675

(22) Filed: Oct. 28, 2019

(65) Prior Publication Data

US 2020/0067827 A1 Feb. 27, 2020

Related U.S. Application Data

(63) Continuation of application No. PCT/CN2018/082469, filed on Apr. 10, 2018.

(30) Foreign Application Priority Data

Apr. 28, 2017 (CN) .......................... 201710295516.7

(51) Int. Cl.
*H04L 12/709* (2013.01)
*H04B 10/2575* (2013.01)
(Continued)

(52) U.S. Cl.
CPC ..... *H04L 45/245* (2013.01); *H04B 10/25753* (2013.01); *H04J 3/1652* (2013.01); *H04J 14/0227* (2013.01); *H04L 69/14* (2013.01)

(58) Field of Classification Search
CPC . H04B 10/25753; Y02D 30/00; H04J 3/1652; H04J 14/0227; H04J 3/1658;
(Continued)

(56) References Cited

U.S. PATENT DOCUMENTS

| 6,892,334 B2 | 5/2005 | Slutz et al. |
| 7,467,056 B2 | 12/2008 | Maniloff et al. |

(Continued)

FOREIGN PATENT DOCUMENTS

| CN | 101242238 A | 8/2008 |
| CN | 101729940 A | 6/2010 |

(Continued)

OTHER PUBLICATIONS

"OTN Interface Standards for Rates Beyond 100 GB/s"; Gorshe; Journal of Lightwave Technology, vol. 36, No. 1; Jan. 1, 2018 (Year: 2018).*

(Continued)

*Primary Examiner* — Benjamin H Elliott, IV
(74) *Attorney, Agent, or Firm* — Conely Rose, P.C.

(57) ABSTRACT

A link group configuration method includes obtaining first status information of M links between a source end device and a receive end device, where the first status information indicates a status of a differential delay between any two of the M links, obtaining first capability information of the receive end device, where the first capability information indicates a first capability of performing differential delay compensation on the M links by the receive end device, grouping N of the M links into a first link group based on the first status information and the first capability information, and sending first configuration information to a second device, where the first configuration information includes information used to indicate the first link group.

20 Claims, 12 Drawing Sheets

(51) Int. Cl.
*H04J 3/16* (2006.01)
*H04J 14/02* (2006.01)
*H04L 29/06* (2006.01)

(58) Field of Classification Search
CPC ......... H04L 45/245; H04L 69/14; H04J 7/00; H04L 12/28; H04L 41/0823; H04L 43/0852
See application file for complete search history.

(56) References Cited

U.S. PATENT DOCUMENTS

| | | | | |
|---|---|---|---|---|
| 8,913,705 | B2 | 12/2014 | Chang | |
| 2009/0247068 | A1* | 10/2009 | Toyoda | H04J 3/04 455/8 |
| 2016/0028586 | A1* | 1/2016 | Blair | H04L 41/0826 398/45 |
| 2017/0005949 | A1* | 1/2017 | Gareau | H04L 12/413 |
| 2017/0201318 | A1* | 7/2017 | Yazar | H04B 10/03 |
| 2018/0123714 | A1* | 5/2018 | Zhong | H04L 25/14 |
| 2018/0310199 | A1* | 10/2018 | Halabian | H04W 28/0252 |
| 2020/0067827 | A1* | 2/2020 | Mei | H04B 10/25753 |

FOREIGN PATENT DOCUMENTS

| | | |
|---|---|---|
| CN | 106341207 A | 1/2017 |
| CN | 106452812 A | 2/2017 |
| EP | 3113502 A1 | 1/2017 |
| JP | 2012147479 A | 8/2012 |
| JP | 2013131843 A | 7/2013 |
| WO | 2016061399 A1 | 4/2016 |

OTHER PUBLICATIONS

Machine Translation and Abstract of Chinese Publication No. CN106452812, Feb. 22, 2017, 30 pages.
"IEEE Std 802.3," LAN / MAN Standards Committee of the IEEE Computer Society, IEEE Standard for Ethernet , Part 1, Sep. 3, 2015, 2008 pages.
"IEEE Std 802.3," LAN / MAN Standards Committee of the IEEE Computer Society, IEEE Standard for Ethernet , Part 2, Sep. 3, 2015, 2009 pages.
OIF FlexE IA 1.0, "Flex Ethernet Implementation Agreement," Mar. 2016, 31 pages.
ITU-T G.709.1/Y.1331.1, "Series G: Transmission Systems and Media, Digital Systems and Networks, Digital terminal equipments—General, Series Y: Global Information Infrastructure, Internet Protocol Aspects, Next-Generation Networks, Internet of Things and Smart Cities, Internet protocol aspects—Transport, Flexible OTN short-reach interface," Jan. 2017, 30 pages.
Foreign Communication From a Counterpart Application, Chinese Application No. 2017102955167, Chinese Search Report dated Mar. 12, 2019, 2 pages.
Foreign Communication From a Counterpart Application, Chinese Application No. 2017102955167, Chinese Office Action dated Mar. 22, 2019, 3 pages.
Foreign Communication From a Counterpart Application, PCT Application No. PCT/CN2018/082469, English Translation of International Search Report dated Jul. 11, 2018, 2 pages.
Foreign Communication From a Counterpart Application, PCT Application No. PCT/CN2018/082469, English Translation of Written Opinion dated Jul. 11, 2018, 4 pages.
Huang, J., "Possible New Work Items for 802.1 Related to OIF Flex Ethernet (FlexE)," XP068109597, new-flexe-huang-possible-work-0516-v01, vol. 802, No. v01, May 23, 2016, 8 pages.

\* cited by examiner

LINK GROUP CONFIGURATION METHOD AND DEVICE

CROSS-REFERENCE TO RELATED APPLICATIONS

This application is a continuation of International Patent Application No. PCT/CN2018/082469 filed on Apr. 10, 2018, which claims priority to Chinese Patent Application No. 201710295516.7 filed on Apr. 28, 2017. The disclosures of the aforementioned applications are hereby incorporated by reference in their entireties.

TECHNICAL FIELD

This application relates to the transport network field, and in particular, to a link group configuration method and device.

BACKGROUND

Currently, in an Ethernet transport network, a plurality of physical connection links (hereinafter referred to as "link") are usually bundled into one logical link using a link aggregation group (LAG) technology to increase bandwidth and improve link availability.

In the LAG technology, S physical connection links, between adjacent devices, whose bandwidth rates R are the same are usually bundled into one LAG whose bandwidth rate is S*R to implement linear enhancement of the bandwidth rate, thereby satisfying a bandwidth increase requirement. For a user service above a Media Access Control (MAC) layer, the LAG is represented as a logical interface. A transmission device may classify packets from the MAC layer based on information such as a source MAC address and/or destination MAC address or a virtual local area network (VLAN) label to distinguish between different services. For example, packets with a same source MAC address and a same destination MAC address belong to a same service. After being processed using a hash algorithm, a plurality of services are allocated and restricted to one specific link of the LAG for sending. In the LAG technology, a packet of one service is sent only using one link. Therefore, there is no packet disorder problem for the service, and the LAG does not need to compensate a transmission delay difference between links. However, because in the LAG technology, a packet of one service is sent only using one link, to be specific, traffic of one specific service in services cannot exceed a bandwidth rate R of a single link, the LAG cannot reflect a bandwidth rate of S*R for a single service.

In a flexible Ethernet (FlexE) or a flexible optical transport network (FlexO), a LAG may be formed through link bundling and concatenation in order to support parallel transmission across a plurality of links to carry at least one service. The optical transport network is referred to as OTN. Because of cross-link service transmission, differential delay compensation needs to be performed for a transmission delay of each link, to align services that are transmitted in parallel on a plurality of links. A differential delay compensation capability of a receive end device is actually subject to a specific engineering restriction. If a differential delay of a link exceeds the differential delay compensation capability of the receive end device, an entire LAG fails consequently.

SUMMARY

This application provides a link group configuration method and device in order to improve availability and robustness of a link in a transport network.

According to a first aspect, a link group configuration method is provided, including obtaining, by a first device, first status information of M links between a source end device and a receive end device, where the first status information is used to indicate a status of a differential delay between any two of the M links, any one of the M links is a FlexE physical connection link or a FlexO physical connection link, and M is an integer greater than or equal to 2, obtaining, by the first device, first capability information of the receive end device, where the first capability information is used to indicate a first capability of performing differential delay compensation on the M links by the receive end device, grouping, by the first device, N of the M links into a first link group based on the first status information and the first capability information, where N is an integer less than or equal to M and greater than or equal to 2, and sending, by the first device, first configuration information to a second device, where the first configuration information includes information used to indicate the first link group.

It should be understood that the first device is a decision device that determines a link group division manner, and the second device includes a related device that cooperates with the decision device to complete link group configuration.

It should be further understood that the link group configuration method in the first aspect is applied to a case in which the M links cannot be aligned on the receive end device, that is, a case in which the first capability of performing differential delay compensation on the M links by the receive end device is insufficient to align the M links.

According to the link group configuration method in the first aspect, the first device groups the N of the M links into the first link group based on a status of a differential delay between the M links between the source end device and the receive end device and the capability of performing differential delay compensation on the M links by the receive end device. This avoids a case in which all of the M links are unavailable when the differential delay between the M links exceeds the differential delay compensation capability of the receive end device. Therefore, availability and robustness of a link in a transport network can be improved.

In a possible implementation of the first aspect, the first device is the receive end device, the second device is the source end device, and obtaining, by a first device, first status information of M links between a source end device and a receive end device includes measuring, by the first device, a differential delay between the M links to obtain the first status information, and the method further includes performing, by the first device, differential delay compensation on links in the first link group based on the first configuration information, and performing, by the first device, service data transmission with the second device based on the first link group. In this possible implementation, the receive end device acts as a decision device and determines a link group configuration. In this way, execution is easy and simple, and signaling overheads during link group configuration are small.

In a possible implementation of the first aspect, obtaining, by a first device, first status information of M links between a source end device and a receive end device includes receiving, by the first device, the first status information sent by the receive end device, and obtaining, by the first device, first capability information of the receive end device includes receiving, by the first device, the first capability information sent by the receive end device.

In a possible implementation, the first device is the source end device, and the second device is the receive end device.

In this possible implementation, the source end device acts as a decision device, and may determine a link group configuration with reference to related information of service data, for example, comprehensive factors such as a service volume and/or bandwidth.

In another possible implementation, the first device is a management device, and the second device includes the receive end device and/or the source end device. In this possible implementation, the management device acts as a decision device. In this way, the management device can receive related information of the source end device and the receive end device, and can determine a link group configuration in consideration of comprehensive factors such as a service volume and/or bandwidth. In addition, this can avoid a computing amount possibly resulting from decision-making of the source end device or the receive end device, and can reduce load of the source end device and the receive end device.

In a possible implementation of the first aspect, K upstream devices of the receive end device on the M links have a delayed-sending compensation capability, where K is a positive integer, the K upstream devices include the source end device and/or at least one intermediate device, the intermediate device is located between the source end device and the receive end device on the M links, and the method further includes obtaining, by the first device, second capability information and second status information of each of the K upstream devices, where the second capability information is used to indicate a second capability of performing delayed-sending compensation on at least one of the M links by each upstream device, and the second status information is used to indicate a current status of delayed-sending compensation performed on the at least one of the M links by each upstream device, grouping, by the first device, N of the M links into a first link group based on the first status information and the first capability information includes grouping, by the first device, the N of the M links into the first link group based on the first status information, the first capability information, the second status information, and the second capability information, and the method further includes determining, by the first device based on the first status information, the first capability information, the second status information, and the second capability information, a configuration of delayed-sending compensation that each upstream device needs to perform on a corresponding link.

When the M links cannot be aligned on the receive end device, the M links cannot constitute a link group, to be specific, a FlexE group or a FlexO group crashes and cannot work. The source end device, the receive end device, the intermediate device, and the like in the embodiments of this application may all have a differential delay compensation capability or a delayed-sending compensation capability. The devices in this possible implementation implement link group compensation through capability negotiation. When a compensation capability of each device in the FlexE group or the FlexO group between the source end device and the receive end device is insufficient to compensate a differential delay between links, a link group is configured such that the source end device performs cross-link service data transmission only on delay-aligned links. Alternatively, devices perform collaborative compensation such that the M links can be aligned on the receive end device finally. This can ensure working of the FlexE group or the FlexO group, and can improve link utilization.

In a possible implementation of the first aspect, the first device is the receive end device, the second device is the source end device, and obtaining, by a first device, first status information of M links between a source end device and a receive end device includes measuring, by the first device, a differential delay between the M links to obtain the first status information, obtaining, by the first device, second capability information and second status information of each of the K upstream devices includes receiving, by the first device, the second capability information and the second status information that are sent by each upstream device, and the method further includes sending, by the first device, second configuration information to at least one of the K upstream devices, where the second configuration information is used to indicate a configuration of delayed-sending compensation that the at least one upstream device needs to perform on a corresponding link.

In a possible implementation of the first aspect, the method further includes performing, by the first device based on the first configuration information, differential delay compensation on a link, in the first link group, on which the at least one upstream device has performed delayed-sending compensation based on the second configuration information, and performing, by the first device, service data transmission with the second device based on the first link group.

In a possible implementation of the first aspect, the first device is the source end device, the second device is the receive end device, and obtaining, by a first device, first status information of M links between a source end device and a receive end device includes receiving, by the first device, the first status information sent by the receive end device, and obtaining, by the first device, first capability information of the receive end device includes receiving, by the first device, the first capability information sent by the receive end device.

In a possible implementation of the first aspect, the K upstream devices include the first device, and the method further includes transmitting, by the first device based on the first link group, service data to the second device based on a determined configuration of delayed-sending compensation that the first device needs to perform on a corresponding link.

In a possible implementation of the first aspect, the K upstream devices include at least one intermediate device, and obtaining, by the first device, second capability information and second status information of each of the K upstream devices includes receiving, by the first device, the second capability information and the second status information that are sent by each of the at least one intermediate device, and the method further includes sending, by the first device, second configuration information to at least some of the at least one intermediate device, where the second configuration information is used to indicate a configuration of delayed-sending compensation that the at least some intermediate devices need to perform on a corresponding link.

In a possible implementation of the first aspect, the first device is a management device, the second device includes the receive end device and/or the source end device, and the obtaining, by a first device, first status information of M links between a source end device and a receive end device includes receiving, by the first device, the first status information sent by the receive end device, obtaining, by the first device, first capability information of the receive end device includes receiving, by the first device, the first capability information sent by the receive end device, obtaining, by the first device, second capability information and second status information of each of the K upstream devices includes receiving, by the first device, the second capability information and the second status information that are sent by each upstream device, and the method further includes sending, by the first device, second configuration information to at least one of the K upstream devices, where the second configuration information is used to indicate a configuration of delayed-sending compensation that the at least one upstream device needs to perform on a corresponding link.

In a possible implementation of the first aspect, the first configuration information includes a mark used to indicate that a link belongs to the first link group.

In a possible implementation of the first aspect, sending, by the first device, first configuration information to a second device includes adding, by the first device, the first configuration information to a reserved field of an overhead code block, and sending the reserved field to the second device.

In a possible implementation of the first aspect, sending, by the first device, first configuration information to a second device includes sending, by the first device, the first configuration information to the second device using a first link of the N links, where the first configuration information is used to indicate that the first link belongs to the first link group.

In a possible implementation of the first aspect, a first part of bits in the first configuration information is used to indicate that the first link and another link constitute the first link group, and a second part of bits in the first configuration information is a mark of the first link group.

In a possible implementation of the first aspect, receiving, by the first device, the first status information sent by the receive end device includes receiving, by the first device, the first status information that is sent by the receive end device and that is carried in a first type-length-value (TLV) unit in a Link Layer Discovery Protocol (LLDP) format of a management channel of an overhead code block.

In a possible implementation of the first aspect, the first TLV unit is further capable of carrying information that is used to indicate a current status of delayed-sending compensation performed on the M links by the receive end device when the receive end device sends service data to the source end device.

In a possible implementation of the first aspect, the first TLV unit is further capable of carrying information that is used to indicate a configuration of delayed-sending compensation that an upstream device needs to perform on a corresponding link.

In a possible implementation of the first aspect, receiving, by the first device, the first capability information sent by the receive end device includes receiving, by the first device, the first capability information that is sent by the receive end device and that is carried in a second TLV unit in an LLDP format of a management channel of an overhead code block.

In a possible implementation of the first aspect, the second TLV unit is further capable of carrying information that is used to indicate a capability of performing delayed-sending compensation on the M links by the receive end device when the receive end device sends service data to the source end device.

According to a second aspect, a link group configuration device is provided, where the link group configuration device is a first device, and is configured to execute the method in any one of the first aspect or the possible implementations of the first aspect. Further, the link group configuration device may include modules configured to execute the method in any one of the first aspect or the possible implementations of the first aspect.

According to a third aspect, a link group configuration device is provided, where the link group configuration device is a first device, and the link group configuration device includes a processor, a memory, and a network interface. The memory is configured to store an instruction. The processor and the network interface are configured to execute the instruction stored in the memory, and execution of the instruction stored in the memory causes the processor and the network interface to execute the method in any one of the first aspect or the possible implementations of the first aspect.

According to a fourth aspect, a link group configuration device is provided, where the link group configuration device is a first device, and the link group configuration device includes a processor, a memory, and a network interface. The memory is configured to store an instruction. The processor and the network interface are configured to execute the instruction stored in the memory, and execution of the instruction stored in the memory causes obtaining, by the first device, first status information of M links between a source end device and a receive end device, where the first status information is used to indicate a status of a differential delay between any two of the M links, any one of the M links is a FlexE physical connection link or a FlexO physical connection link, and M is an integer greater than or equal to 2, obtaining, by the first device, first capability information of the receive end device, where the first capability information is used to indicate a first capability of performing differential delay compensation on the M links by the receive end device, grouping, by the first device, N of the M links into a first link group based on the first status information and the first capability information, where N is an integer less than or equal to M and greater than or equal to 2, and sending, by the first device, first configuration information to a second device, where the first configuration information includes information used to indicate the first link group.

According to a fifth aspect, a computer storage medium is provided, where the computer storage medium stores an instruction, and when the instruction is executed on a computer, the computer executes the method in any one of the first aspect or the possible implementations of the first aspect.

According to a sixth aspect, a computer program product including an instruction is provided, and when a computer executes the instruction of the computer program product, the computer executes the method in any one of the first aspect or the possible implementations of the first aspect.

Effects that can be achieved in the second aspect to the sixth aspect are corresponding to effects that can be achieved in the first aspect, and details are not described herein again.

It should be understood that, in the aspects of this application and corresponding implementations of the aspects, for transmission of any one of the first status information, the first capability information, the second status information, the second capability information, the first configuration information, or the second configuration information, status, capability, or configuration information corresponding to each link may be transmitted on the link, that is, related information is transmitted using a link as a granularity. Certainly, in the aspects of this application and corresponding implementations of the aspects, related information may alternatively be transmitted using another granularity, for example, using a device as a granularity. This is not limited herein.

It should be further understood that, in the aspects of this application and corresponding implementations of the aspects, differential delay compensation is delayed-receiving compensation, namely, compensation in a receiving direction, and usually is also referred to as "deskew", and delayed-sending compensation is compensation in a sending direction, and usually is also referred to as "remote deskew".

DESCRIPTION OF EMBODIMENTS

Figure 1:
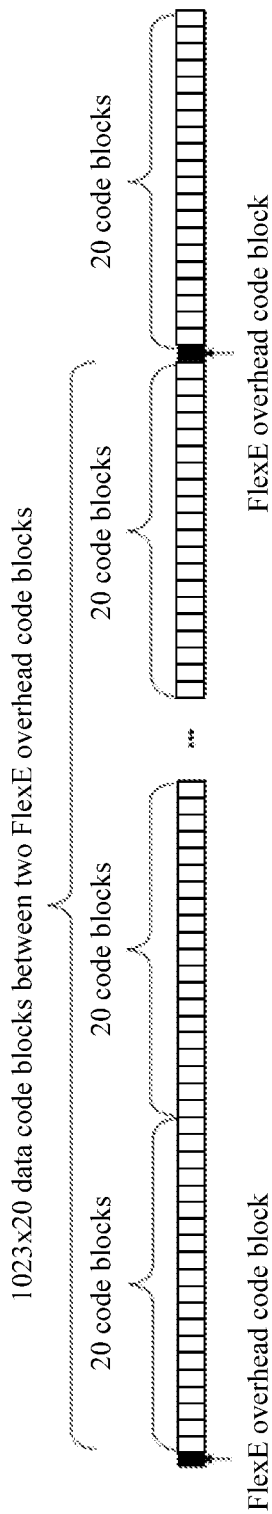
FIG. 1 is a schematic diagram of a code block stream at a 100G FlexE interface.

The following describes the technical solutions in this application with reference to the accompanying drawings.

It should be understood that the technical solutions in the embodiments of this application may be applied to a FlexO, a FlexE, or another network. This is not limited in the embodiments of this application.

It should be understood that a physical connection link in the embodiments of this application may be simply referred to as a "link", and a link in the FlexE may also be referred to as a "PHY link". The link in the embodiments of this application is a link between a source end device and a receive end device, and there may be an intermediate device on the link from the source end device to the receive end device.

The following briefly describes concepts in this specification.

FlexE technology is as follows.

For a considerably long time period till now, the Ethernet has been widely applied and significantly developed. An Ethernet interface rate increases tenfold, and has continuously evolved from 10 megabits per second (Mbps) to 100 Mbps, 1000 Mbps (that is 1 gigabits per second (Gbps)), 10 Gbps, and 100 Gbps. With the ever-increasing Ethernet interface rate, further improvement of the Ethernet interface rate gradually approaches a bottleneck technically. In addition to meet diversified Ethernet interface rate requirements in an actual scenario, for example, 200 Gbps, Ethernet interfaces of 40 Gbps, 200 Gbps, and 400 Gbps are developed.

Before a standard of a new-generation higher-rate Ethernet interface comes into being, a bandwidth requirement of a network usually exceeds an existing Ethernet interface rate. In a transition phase in which a standard of a new Ethernet interface comes into being and costs of the new Ethernet interface are relatively high, a LAG technology allows a plurality of low-rate Ethernet interfaces to be bundled into one LAG to implement a virtual high-rate Ethernet interface. However, in the LAG technology, service data is allocated, based on a service, to each interface in the LAG using a hash algorithm. Similar to a service-based load balancing method, the LAG also has a problem that interface bandwidth allocation is unbalanced and utilization is low. If there is a service whose rate is greater than a single-interface rate, the service still needs to be allocated to only one interface using the hash algorithm, and as a result, the interface is congested and a service transmission rate is limited by a rate of the interface.

In a forwarding device, when a service is forwarded from a low-rate interface to a high-rate interface, a packet of the entire service needs to be buffered before forwarding, to avoid packet breakage. This greatly increases a service data transmission delay. To improve efficiency of forwarding between interfaces of different rates, the optical internetworking forum (OOIF) releases a multi-link gearbox (MLG) technology in order to inversely multiplex a high-rate Ethernet interface and divide the high-rate Ethernet interface into several low-rate Ethernet interfaces. However, the MLG technology supports only several fixed interface division manners, for example, dividing a 40G Ethernet interface into four 10G Ethernet interfaces or two 20G Ethernet interfaces, and a subinterface type supported by the MLG technology is limited. Therefore, flexibility is not high enough.

A FlexE technology is a flexible-Ethernet interface technology developed for the foregoing requirement. FIG. 1 is a schematic diagram of a code block stream at a 100G FlexE interface. As defined in the FlexE 1.0 standard, a Flex performs time division multiplexing (TDM) on a service of a 100G Ethernet interface using 20 code blocks (block) as a period, to divide the 100G Ethernet interface into 20 timeslots at a granularity of 5G (corresponding to one code block in a period of 20 code blocks). One FlexE overhead (OH) code block is inserted at an interval of 1023×20 data code blocks, as shown in FIG. 1. The FlexE may bundle S Ethernet interfaces into one LAG, and service data may be transmitted in an idle timeslot that is randomly selected from 20*S timeslots of the LAG.

Figure 2:
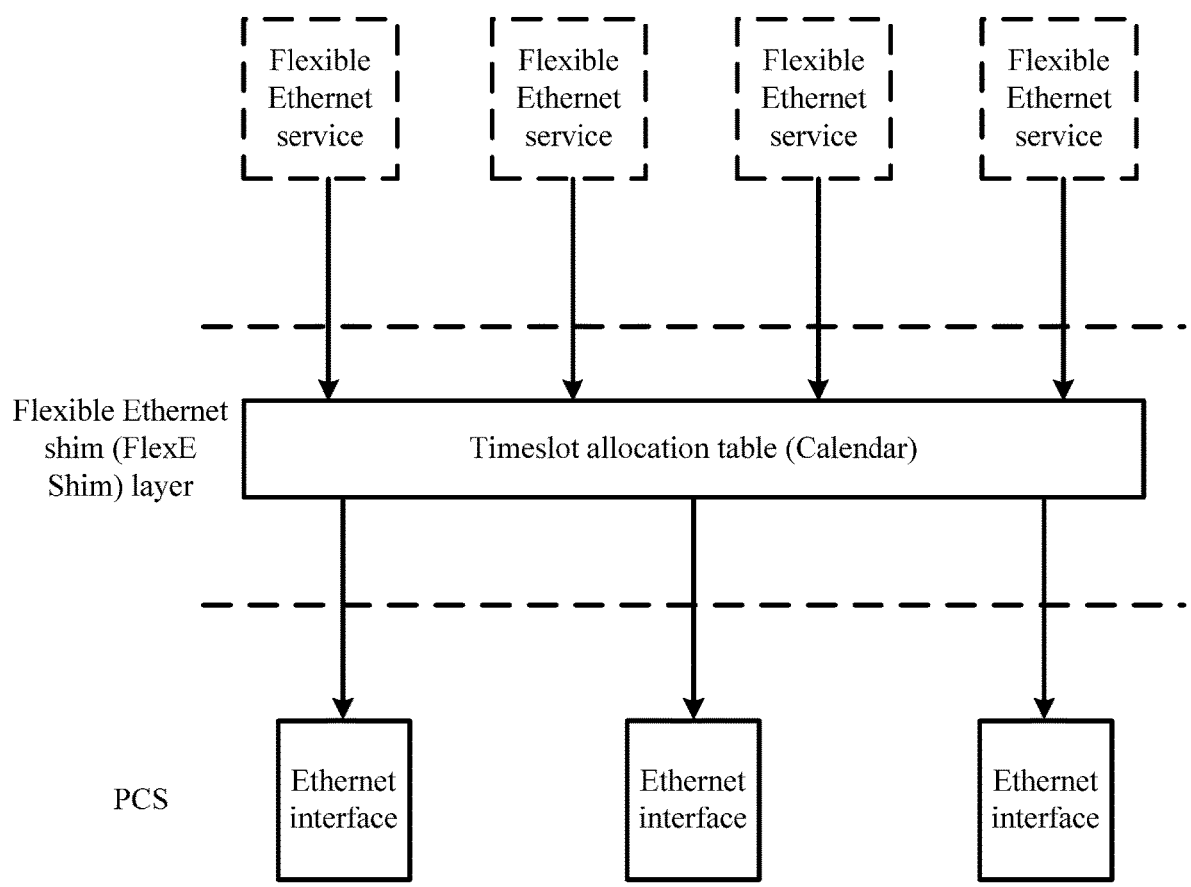
FIG. 2 is a schematic block diagram of a functional structure of a receive end device in a FlexE.

FIG. 2 is a schematic block diagram of a functional structure of a receive end device in a FlexE. As shown in FIG. 2, according to a FlexE technology, a new layer, that is, a FlexE shim layer, is inserted above a physical coding sublayer (PCS) of an Ethernet interface. The FlexE shim layer carries a plurality of FlexE services (also referred to as FlexE Client) upward, and is connected to a plurality of 100G Ethernet interfaces downward. The FlexE 1.0 standard stipulates that a FlexE client is a code block stream of 64-bit data to 66-bit line code (64b/66b) encoding, and after rate adaptation is performed through idle code block insertion/deletion (that is, Idle Insert/Delete), code blocks in a code block stream of a FlexE service are successively placed into timeslots allocated to the FlexE service.

Figure 3:
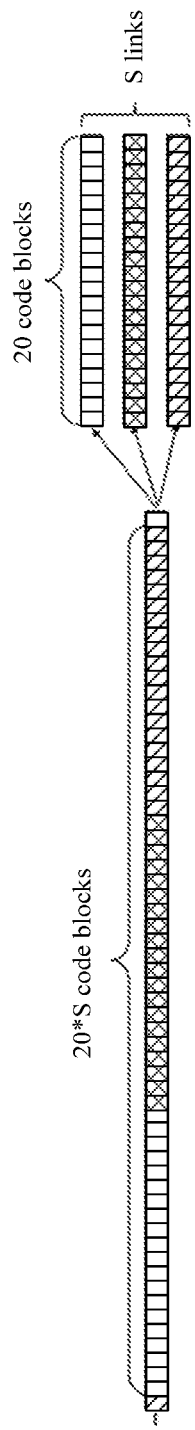
FIG. 3 is a schematic diagram of sending, by a receive end device, a code block stream in a FlexE.

FIG. 3 is a schematic diagram of sending, by a receive end device, a code block stream in a FlexE. As shown in FIG. 3, in the FlexE, there are 20*S timeslots in total for a LAG including S physical connection links, that is, a FlexE group including S physical links (also referred to as PHYs). At a FlexE shim layer, a position of a 66b code block is allocated using a 20*S-long timeslot allocation table (Calendar). For example, the first 20 code blocks in a period are sent using a PHY1, subsequent 20 code blocks are sent using a PHY2, and so on, until code blocks are sent using a PHYS. Herein, 20 code blocks on each PHY may also be referred to as a timeslot allocation sub-table (Sub-calendar). In a specific example, a 10G FlexE service occupies two of the 20*S timeslots. In this case, in one period, two code blocks are extracted from a code block stream of the 10G FlexE service, and are placed at corresponding positions (one code block corresponds to one 5G timeslot). In another specific example, a 25G FlexE service occupies five timeslots, in each period, five code blocks are extracted from a code block stream of the 25G FlexE service, and are placed at corresponding positions in the calendar. Configuration information indicating which FlexE service is transmitted in each timeslot in the FlexE group is specified in a specific field in a FlexE OH code block.

Figure 4:
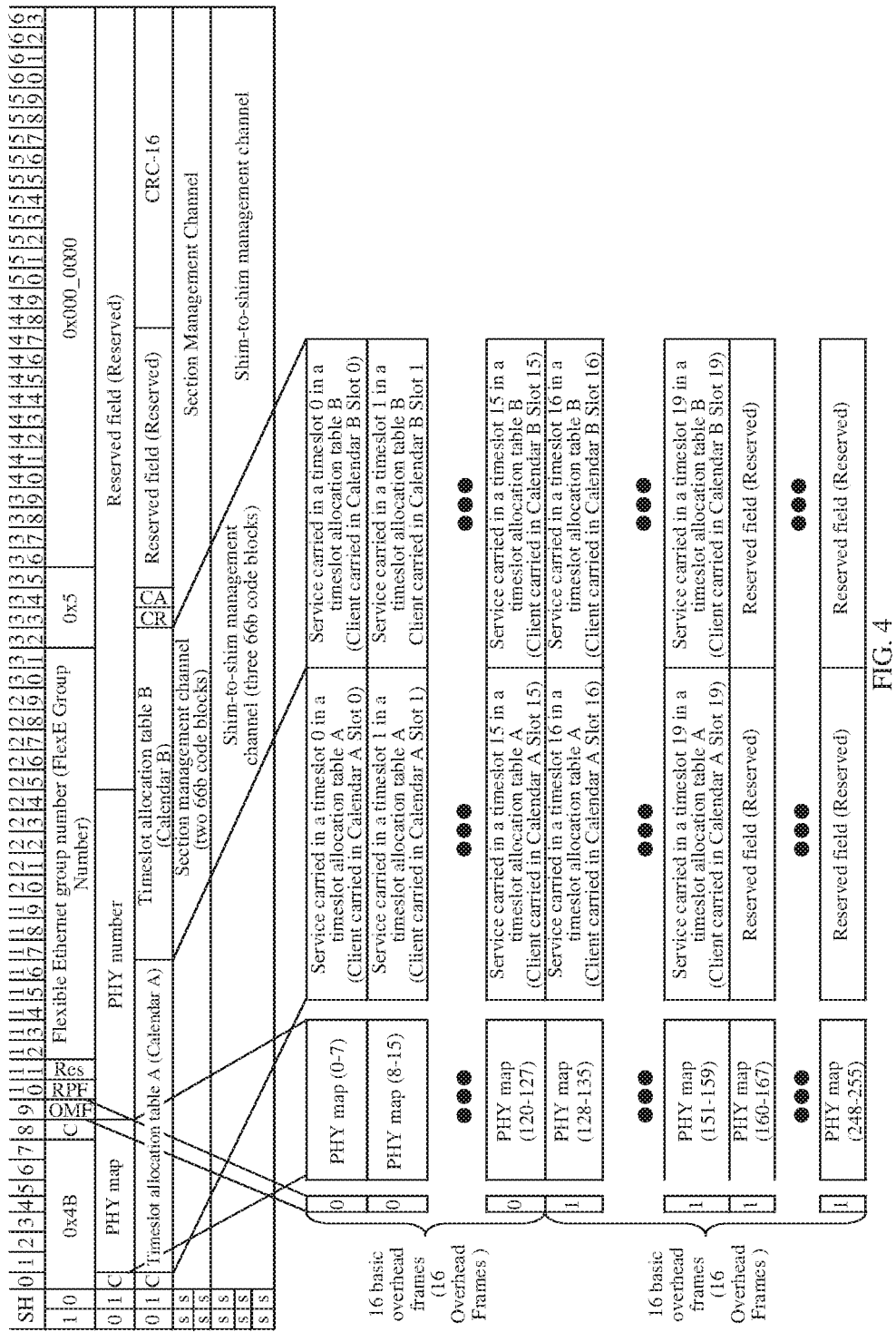
FIG. 4 is a schematic diagram of a frame format of a FlexE overhead code block.

FIG. 4 is a schematic diagram of a frame format of a FlexE overhead code block. As shown in FIG. 4, 32 contiguous FlexE frames constitute one FlexE multiframe, and one FlexE OH frame includes eight contiguous FlexE OH code blocks. For the first code block in a FlexE frame, a "0×4b" or "0×5" field is used as a mark field to identify the code block as an OH code block. After identifying the OH code block, a receive end device can receive a next OH code block after receiving 1023×20 64b/66b code blocks (data code block). The rest may be deduced by analogy, and the entire FlexE frame can be extracted from a code block stream.

As shown in FIG. 4, a FlexE OH frame transmitted on each link includes fields such as a FlexE group number, a PHY map, a PHY number, a timeslot allocation table (Calendar) A, and a calendar B. The FlexE group number is used to indicate a number of a FlexE group to which the link belongs. The PHY map (which needs to be indicated using a total of 8×32=256 bits in one FlexE multiframe) is used to indicate distribution of PHYs included in the FlexE group to which the link belongs. The physical link number may be one of 1 to 254. The calendar A and the calendar B are respectively used to indicate a current calendar configuration and an alternative calendar configuration of the FlexE group. In the third code block in each FlexE frame, 16 bits are used to indicate a number of service data transmitted in a timeslot. A first FlexE frame in each FlexE multiframe carries a number of service data transmitted in a corresponding timeslot 0 (slot 0), and so on, until a 20th FlexE frame in the FlexE multiframe carries a number of service data transmitted in a corresponding slot 19. After receiving information about FlexE frames on all links in a FlexE group, the receive end device can obtain a timeslot allocation manner of each piece of service data in the FlexE group.

In a FlexE, service data may be transmitted in a plurality of cross-link timeslots. Therefore, the receive end device needs to perform differential delay compensation on each link in the FlexE group before restoring a FlexE service from a plurality of timeslots. Otherwise, code block disorder may be caused when a FlexE service is restored from cross-link timeslots with a differential delay. The FlexE 1.0 standard stipulates that, in a FlexE group, the first overhead code block in a FlexE frame transmitted on each link is used as a mark, and transmission delays of all links are aligned using a buffer on a receive end device. Usually, a differential delay compensation (deskew) capability for each link is at least 300 ns in a transmission scenario of FlexE group shim-to-shim direct connection, and a differential delay compensation capability for each link is at least 10 micro seconds (μs) during FlexE group long-distance cross-transport-network transmission.

Service data may be transmitted in a plurality of cross-link timeslots in the FlexE group. Therefore, FlexE frames on a plurality of links need to be aligned on the receive end device to ensure that the service data can be restored in a correct sequence from corresponding timeslots. According to the FlexE 1.0 standard, a FlexE frame boundary is used as a reference, to calculate a differential delay between links, and align code block streams on the links using a buffer. As described above, a differential delay, between links in a FlexE group, stipulated in a FlexE standard should be less than or equal to 300 nanoseconds (ns) in the transmission scenario of FlexE group shim-to-shim direct connection, and a differential delay between links should be less than or equal to 10 μs in a long-distance cross-transport-network transmission scenario. If a differential delay on a link in the FlexE group exceeds a differential delay compensation capability of the receive end device, the entire FlexE group fails.

FlexO technology is as follows.

In a FlexO, a plurality of standard-rate ports (for example, m×100G) are bundled to constitute a FlexO group to carry a standard optical transport unit Cn (OTUCn) (n≥1) signal. This makes up a defect of a previous protocol that a port whose bandwidth is greater than 100G is not defined. Similar to that in a FlexE, an OTUCn signal is transmitted in a cross-link manner on a plurality of links, and therefore, service data transmitted on all links needs to be aligned to ensure restoration of the transmitted OTUCn signal. Currently, in the FlexO, it is stipulated that service data on all links in a FlexO group is aligned using a frame alignment signal (FAS) field in an OTUCn frame transmitted using the links. If a differential delay of a link in the FlexO group exceeds a differential delay compensation capability of a receive end device, the entire FlexO group fails.

LLDP technology is as follows.

The embodiments of this application further relate to the LLDP technology. The LLDP is defined in the standard 802.1AB. Using the LLDP, a transport network device may periodically send, using a standard LLDP TLV unit, a multicast packet carrying local information to another adjacent transport network device. The LLDP stipulates that a standard simple network management protocol (SNMP) management information base (MIB) is deployed on each port of the transport network device to store local status information and status information of another adjacent transport network device. Between transport network devices, status information stored in the SNMP MIB is refreshed by sending and receiving the LLDP TLV unit. Using the LLDP can facilitate management and maintenance of transport network device status information.

A TLV unit is a basic information unit in the LLDP. Different types of TLVs may carry different information. The LLDP reserves a TLV unit that can be self-defined by standard organizations. Table 1 shows a definition of each field of an LLDP-format TLV unit that can be self-defined. It should be understood that all TLV units shown in Table 2 to Table 7 in this specification are specific application forms of the TLV unit shown in Table 1.

TABLE 1

LLDP-format TLV unit that can be self-defined
Byte:

| 1 | 2 | 3 to 5 | 6 | 7 to 6 + n (1 ≤ n ≤ 507) |
|---|---|---|---|---|
| Type = 127 (7 bits) | Length (9 bits) | OUI (2 bytes) | Subtype (1 byte) | Organization-defined information (1 to n − 1 bytes) |

Figure 5:
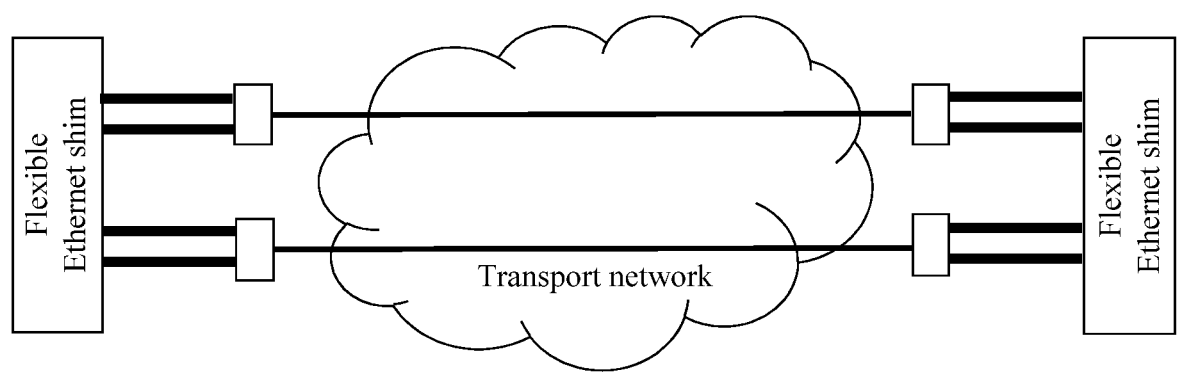
FIG. 5 is a schematic diagram of an application scenario of FlexE cross-transport-network transmission.

The following describes a scenario to which a link group configuration method in the embodiments of this application is applied, with reference to FIG. 2 to FIG. 5. As shown in FIG. 2, a FlexE works between a MAC layer and a PHY layer. In the FlexE, an original reconciliation sublayer (RS) and PCS are modified to implement functions of dividing a conventional Ethernet port into TDM channels and bundling a plurality of Ethernet ports. The LLDP and a LAG technology work at the MAC layer. The FlexE 1.0 standard defines application scenarios of FlexE Ethernet transmission and cross-transport-network transmission. FIG. 5 is a schematic diagram of an application scenario of FlexE cross-transport-network transmission. FlexE cross-transport-network transmission is based on a FlexE aware transport mode. In FIG. 5, a FlexE shim in an Ethernet router needs to perform differential delay compensation on two links in a FlexE group connected to the FlexE shim. A FlexO works at the PHY layer. Similar to that in the FlexE, differential delay compensation also needs to be performed on a plurality of links.

Based on a case in which a FlexE group in the FlexE may fail and a case in which a FlexO group in the FlexO may fail, the embodiments of this application provide a link group configuration method. According to the embodiments of this application, compensation negotiation between transport network devices is implemented through reconstruction of functional parts related to a related FlexE or FlexO. After the reconstruction is performed according to the embodiments of this application, during link group establishment, the transport network device allows a link group to include a link that exceeds a differential delay compensation capability of a receive end device. It should be understood that the transport network device in the embodiments of this application may include a source end device, an intermediate device, and a receive end device.

Figure 6:
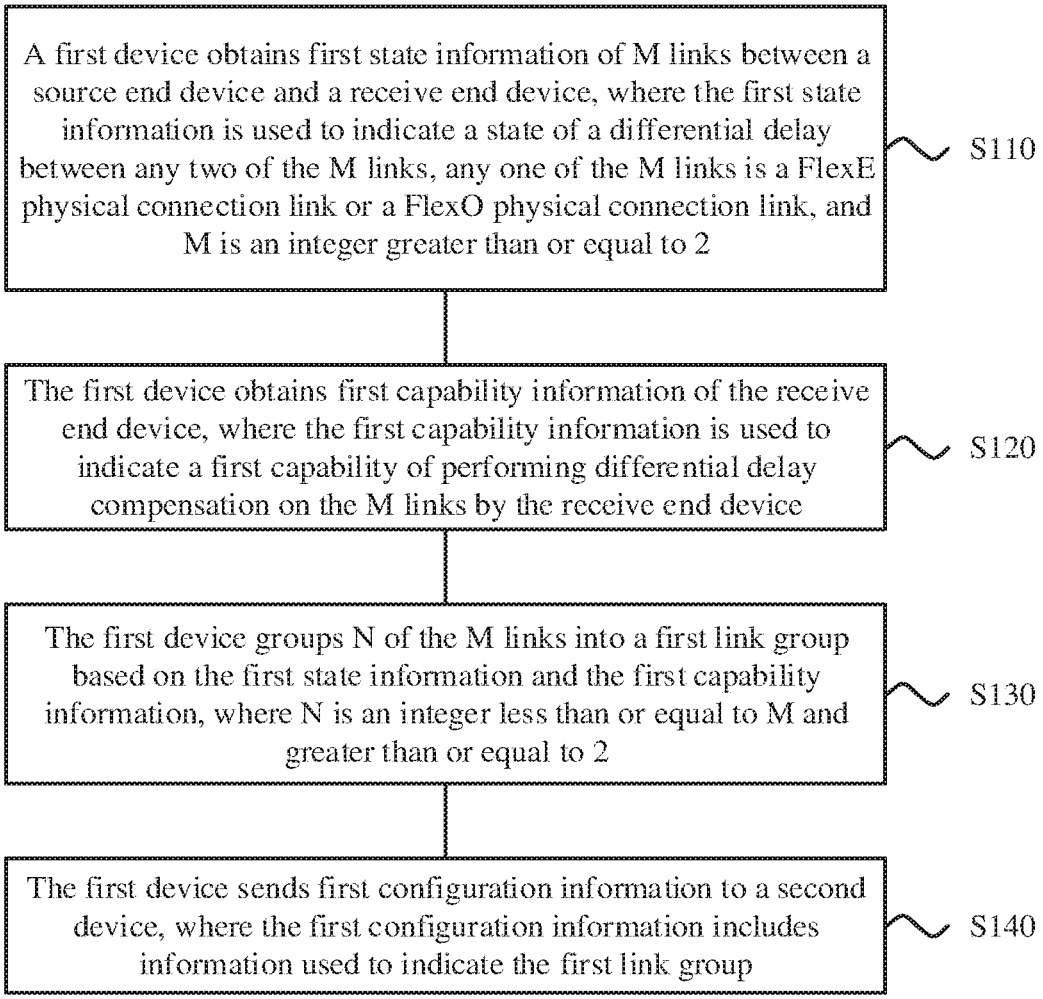
FIG. 6 is a schematic flowchart of a link group configuration method according to an embodiment of this application.

FIG. 6 is a schematic flowchart of a link group configuration method 100 according to an embodiment of this application. As shown in FIG. 6, the link group configuration method 100 may include the following steps.

Step S110: A first device obtains first status information of M links between a source end device and a receive end device, where the first status information is used to indicate a status of a differential delay between any two of the M links, any one of the M links is a FlexE physical connection link or a FlexO physical connection link, and M is an integer greater than or equal to 2.

Step S120: The first device obtains first capability information of the receive end device, where the first capability information is used to indicate a first capability of performing differential delay compensation on the M links by the receive end device.

Step S130: The first device groups N of the M links into a first link group based on the first status information and the first capability information, where N is an integer less than or equal to M and greater than or equal to 2.

Step S140: The first device sends first configuration information to a second device, where the first configuration information includes information used to indicate the first link group.

It should be understood that the first device is a decision device that determines a link group division manner, and the second device includes a related device that cooperates with the decision device to complete link group configuration.

It should be further understood that, in the embodiments of this application, differential delay compensation is delayed-receiving compensation, namely, compensation in a receiving direction, and usually is also referred to as "deskew", and delayed-sending compensation is compensation in a sending direction, and usually is also referred to as "remote deskew".

According to the link group configuration method in this embodiment of this application, the first device groups the N of the M links into the first link group based on a status of a differential delay between the M links between the source end device and the receive end device and the capability of performing differential delay compensation on the M links by the receive end device. This avoids a case in which all of the M links are unavailable when the differential delay between the M links exceeds the differential delay compensation capability of the receive end device. Therefore, availability and robustness of a link in a transport network can be improved.

In a FlexE, a data stream on each link in a FlexE group is in a format of a 64b/66b code block stream of 1 OH block+1023×20 data blocks, and the receive end device uses, as a mark, 0×4b and 0×5 identification fields in the first OH block in a FlexE frame transmitted on each link, to align data code blocks on all links.

Similarly, a FlexO frame is a data stream of 128*5440 bits, and eight frames are one multiframe. The receive end device uses, as a mark, a FAS field in an OTUCn frame carried in each FlexO frame to align data code blocks on all links.

A link group configuration process and a subsequent compensation process in the embodiments of this application may be used for both of the two types of transport networks. In the embodiments, the FlexE is used as an example for description. Certainly, the link group configuration method in the embodiments of this application may alternatively be applied to a FlexO, or may be applied to a transport network using both the FlexE and FlexO technologies.

Figure 7:
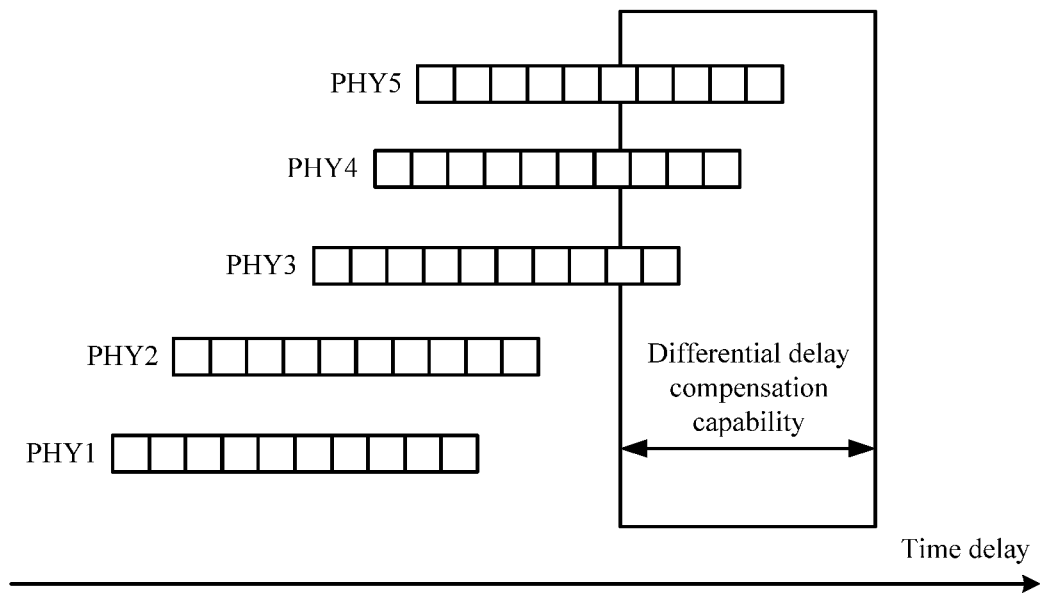
FIG. 7 is a schematic diagram of a status of a differential delay between links according to an embodiment of this application.

FIG. 7 is a schematic diagram of a status of a differential delay between links according to an embodiment of this application. As shown in FIG. 7, there are a total of five links PHY1 to PHY5 between a source end device and a receive end device. FlexE frames are sent between the source end device and the receive end device independently on the links. A horizontal axis in FIG. 7 represents a time delay of FlexE frame arrival on each link, and a width of a shaded box represents a differential delay compensation capability of the receive end device. In the five links shown in FIG. 7, a differential delay between the PHY1 and a PHY 2 is relatively small, and a differential delay between a PHY3, a PHY4, and the PHY5 is relatively small. However, the differential delay compensation capability of the receive end device is insufficient to complete differential delay compensation on the PHY1 to the PHY5.

The following describes in detail the link group configuration method in this application with reference to several embodiments.

Embodiment 1

In this embodiment, the first device, namely a decision device, is the receive end device, and the second device is the source end device. The receive end device has a delayed-receiving compensation capability.

In this embodiment, in step S110, obtaining, by a first device, first status information of M links between a source end device and a receive end device may include measuring, by the first device, a differential delay between the M links, to obtain the first status information. Further, the receive end device may measure the differential delay between the M links using some existing solutions to obtain the first status information.

Further, according to the embodiments of this application, a differential delay between any two links may be obtained by measuring transmission delays of all links and comparing the transmission delays. Alternatively, a counter is added on a receive end device, the counter starts counting from 0 after a mark code block on a quickest link is received, and a counter value x is recorded when a mark code block on another link is received. In this case, a transmission delay difference between the two links is a transmission time corresponding to x code blocks. A specific manner of measuring the differential delay between the M links is not limited in the embodiments of this application.

In a specific example shown in FIG. 7, the first status information may be the differential delay between the PHY1 and the PHY 2 is relatively small, and the differential delay between the PHY3, the PHY4, and the PHY5 is relatively small. However, the differential delay compensation capability of the receive end device is insufficient to complete differential delay compensation on the PHY1 to the PHY5.

Limited by the differential delay compensation capability of the receive end device, the receive end device cannot support differential delay compensation on all of the PHY1 to the PHY5. To maximize a quantity of member links supporting a cross-link service, N links may be selected from all the M links between the source end device and the receive end device, and be marked as "selected". The other M-N links are marked as "standby". In this embodiment, N=3. To be specific, the PHY3, the PHY4, and the PHY5 are marked as "selected", and the other two links PHY1 and PHY2 are marked as "standby". The PHY3, the PHY4, and the PHY5 marked as "selected" constitute the first link group, and the three links in the first link group can carry a cross-link service. The PHY1 and the PHY2 marked as "standby" may be used to independently transmit a complete service. Alternatively, the PHY1 and the PHY2 marked as "standby" are in a standby status, and no service is transmitted in the standby status. Parallel service transmission is neither performed on a link marked as "standby" nor performed on two links that are respectively marked as "standby" and "selected".

Figure 8:
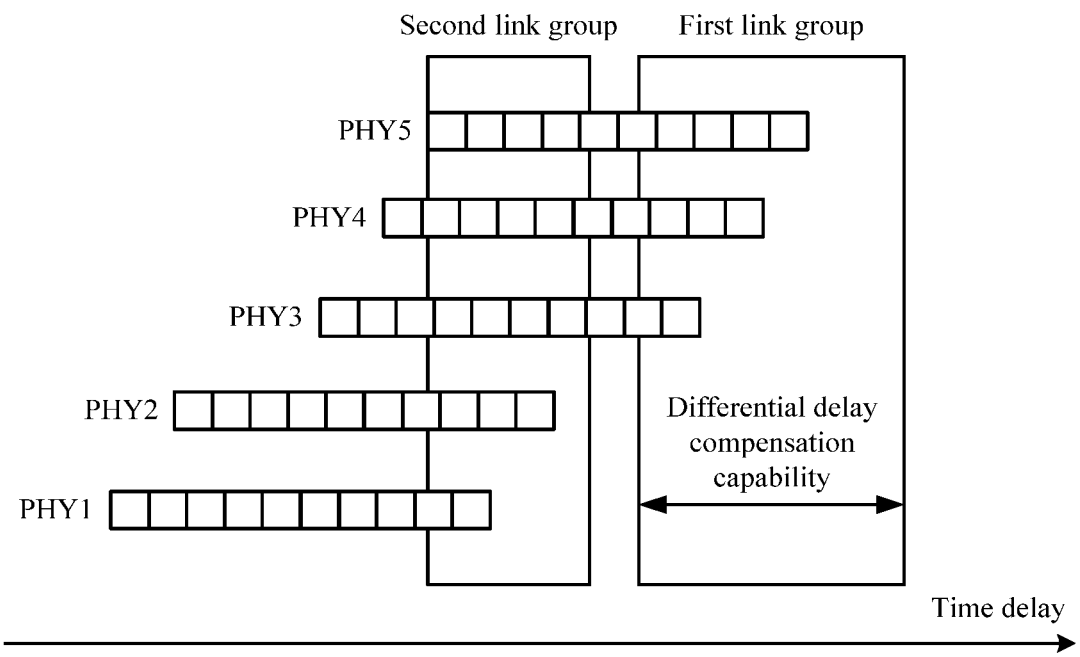
FIG. 8 is a schematic diagram of a link group configuration result according to an embodiment of this application.

Alternatively, two link groups may be established. FIG. 8 is a schematic diagram of a link group configuration result according to this embodiment. Links PHY3, PHY4, and PHY5 are marked as "selected1", namely, the first link group to carry a cross-link service. Links PHY1 and PHY2 are marked as "selected2", namely, a second link group to carry a cross-link service. Cross-link-group service transmission cannot be performed using the first link group marked as "selected1" and the second link group marked as "selected2".

In addition to the foregoing two link group configuration solutions, in this embodiment of this application, there may be more different configuration solutions in which a link group is determined based on a status of a differential delay between links and a capability of performing differential delay compensation on a link by the receive end device. This is not limited in this embodiment of this application.

It should be understood that the foregoing is merely intended to describe the link group configuration method in this embodiment of this application using an example in which M=5, but is not intended to limit the link group configuration method in this embodiment of this application.

Optionally, the link group configuration method in this embodiment may further include performing, by the first device, service data transmission with the second device based on the first link group, and performing, by the first device, differential delay compensation on links in the first link group based on the first configuration information.

Figure 9:
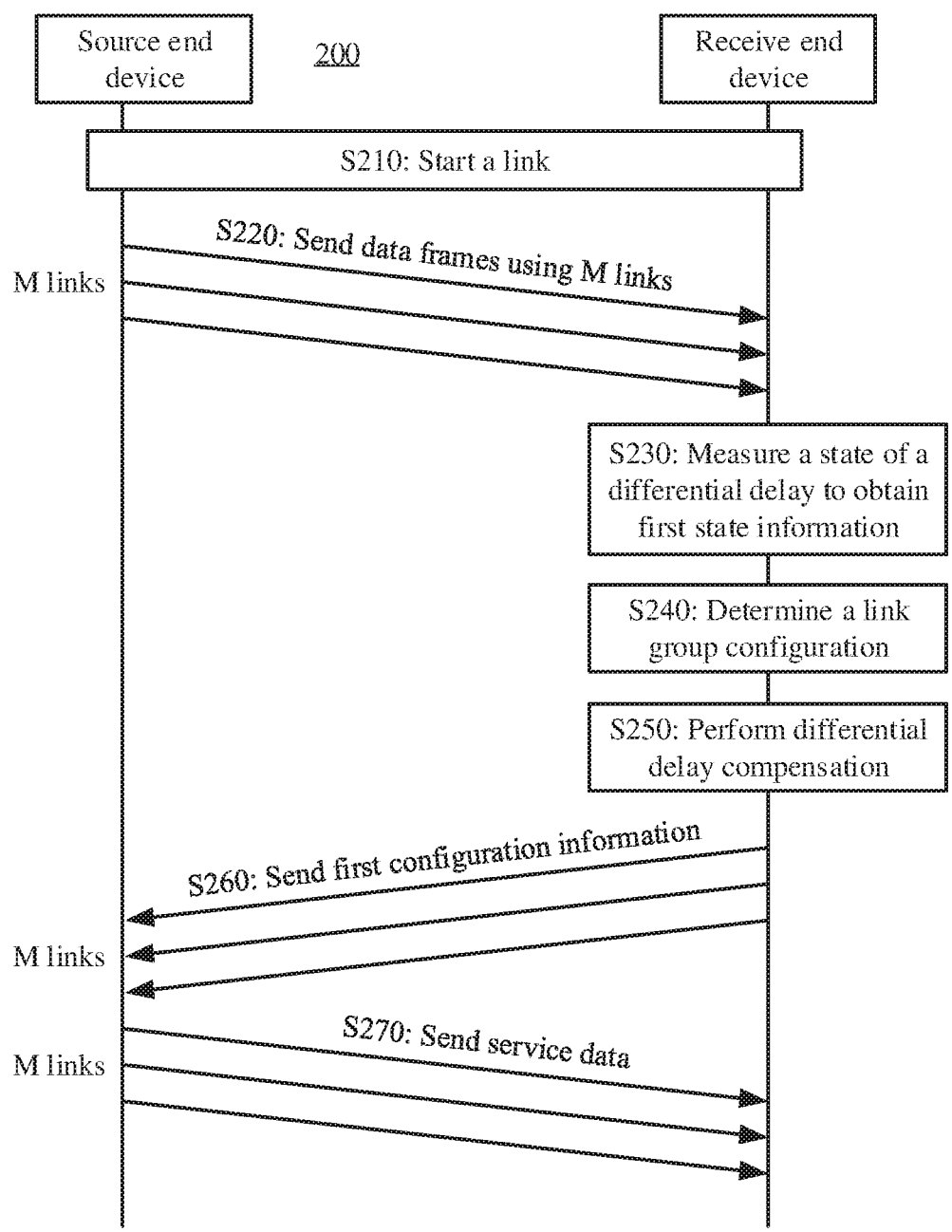
FIG. 9 is a schematic diagram of a process of link group configuration and compensation according to an embodiment of this application.

FIG. 9 is a schematic diagram of a process 200 of link group configuration and compensation according to this embodiment. The process 200 may include the following steps.

Step S210: Start the link between the source end device and the receive end device.

Step S220: The source end device separately sends data frames to the receive end device using the M links independently. Correspondingly, the receive end device receives the data frames sent by the source end device. It should be understood that the data frames may include an alignment mark.

Step S230: The receive end device measures a status of a differential delay between the M links, to obtain the first status information.

Step S240: The receive end device determines a link group configuration, that is, determines the first configuration information, based on the first status information and the first capability information that can represent the capability of performing differential delay compensation on the M links by the receive end device. Further, the configuration includes grouping the N of the M links into the first link group.

Step S250: The receive end device performs differential delay compensation on the M links. Further, the receive end device performs differential delay compensation, that is, sets a differential delay buffer size, based on the first configuration information. That is, the receive end device performs differential delay compensation on the links in the first link group based on the link group configuration determined by the receive end device. It should be understood that steps S250 and S260 may be simultaneously performed. This is not limited in this embodiment.

Step S260: The receive end device sends the first configuration information to the source end device, where the first configuration information includes the information used to indicate the first link group. Correspondingly, the source end device receives the first configuration information sent by the receive end device. The first configuration information may be in a plurality of forms, and the following describes the forms in detail.

Following step may perform optionally.

Step S270: The source end device sends service data to the receive end device based on the first configuration information.

It should be understood that, in the embodiments of this application, the first configuration information may include a mark used to indicate that a link belongs to the first link group. Details are not described in the following embodiments again.

For example, the first configuration information may include a "selected" mark (used to indicate that a link belongs to the first link group) and a "standby" mark that are described above.

For another example, the first configuration information may include a "selected1" mark (used to indicate that a link belongs to the first link group) and a "selected2" mark (used to indicate that a link belongs to the second link group) that are described above. Further, the first device sends the first configuration information to the second device using a first link of the N links, where the first configuration information is used to indicate that the first link belongs to the first link group. That is, link group configuration information may be indicated using a link group identifier (for example, a "subgroup ID", where the "subgroup" is used for distinguishing from an existing "group"). When a "subgroup ID" is added to the M links, a differential delay compensation operation may be performed on links marked with a same "subgroup ID" in order to perform cross-link service transmission, if only one link is marked with a specific "subgroup ID", a service can be independently transmitted only on the link.

For another example, the first configuration information may include information used to indicate a link group to which each of the M links belongs. The first device sends, to the second device using each link, the information used to indicate the link group to which each of the M links belongs.

It should be understood that, in the embodiments of this application, in S140, the sending, by the first device, first configuration information to a second device may include adding, by the first device, the first configuration information to a data code block, and sending the data code block to the second device, or adding, by the first device, the first configuration information to a packet in an LLDB format, a high-level data link control (HDLC) format, or a point to point protocol (PPP) format, and sending the packet to the second device through a management channel of an overhead code block, or adding, by the first device, the first configuration information to a reserved field of an overhead code block, and sending the reserved field to the second device. Details are not described in the following embodiments again.

In a specific example, the first configuration information (for example, transmitting, on each link, a mark of a link group to which the link belongs) is transmitted by sending an LLDP-format packet through a management channel of an OH code block. Further, the first configuration information may be carried in an LLDP-format TLV unit, to be transmitted through a shim-to-shim management channel in a FlexE OH code block.

An optional definition of each field of an LLDP-format TLV unit used to carry the first configuration information is shown in Table 2.

In the TLV unit the first seven bits in bytes 1 to 2 are a TLV type. According to an LLDP stipulation, a type value of a TLV unit that is self-defined by each organization is 127.

The last nine bits in the bytes 1 to 2 are a TLV length, used to indicate a quantity of bytes in a total length of the TLV unit.

Bytes 3 to 5 are an organizationally unique identifier (OUI) of each organization, as stipulated by the LLDP. An OUI corresponding to an OIF is 00-0F-40.

A byte 6 is a subtype of the TLV unit self-defined by each organization, and may be 0x?? (hexadecimal), for example, may be 0x01 (hexadecimal) or 00000001 (binary).

A byte 7 is a mark of a link group to which the link belongs.

0x00 may indicate that a differential delay of the link exceeds the differential delay compensation capability of the receive end device, that is, indicate "standby".

0x01 to 0xFF may indicate that a differential delay of the link is within the differential delay compensation capability of the receive end device, that is, indicate "selected". A specific corresponding value may indicate a number of the link group to which the link belongs.

It should be understood that the definition of each field of the LLDP-format TLV unit, used to carry the first configuration information, shown in Table 2 is merely an example, and may be correspondingly changed depending on a requirement. This is not limited in the embodiments of this application.

TABLE 2

LLDP-format TLV unit used to carry the first configuration information
Byte:

| 1 | 2 | 3 to 5 | 6 | 7 |
|---|---|---|---|---|
| Type = 127 (7 bits) | Length (9 bits) | OUI: 00-0F-40 | Subtype: 0x?? (1 byte) | A mark of a link group to which a link belongs (1 byte) |

After receiving the TLV unit through the management channel of the OH code block, the source end device may complete link group configuration based on an indication of "the mark of the link group to which the link belongs", and send the service data.

Figure 10:
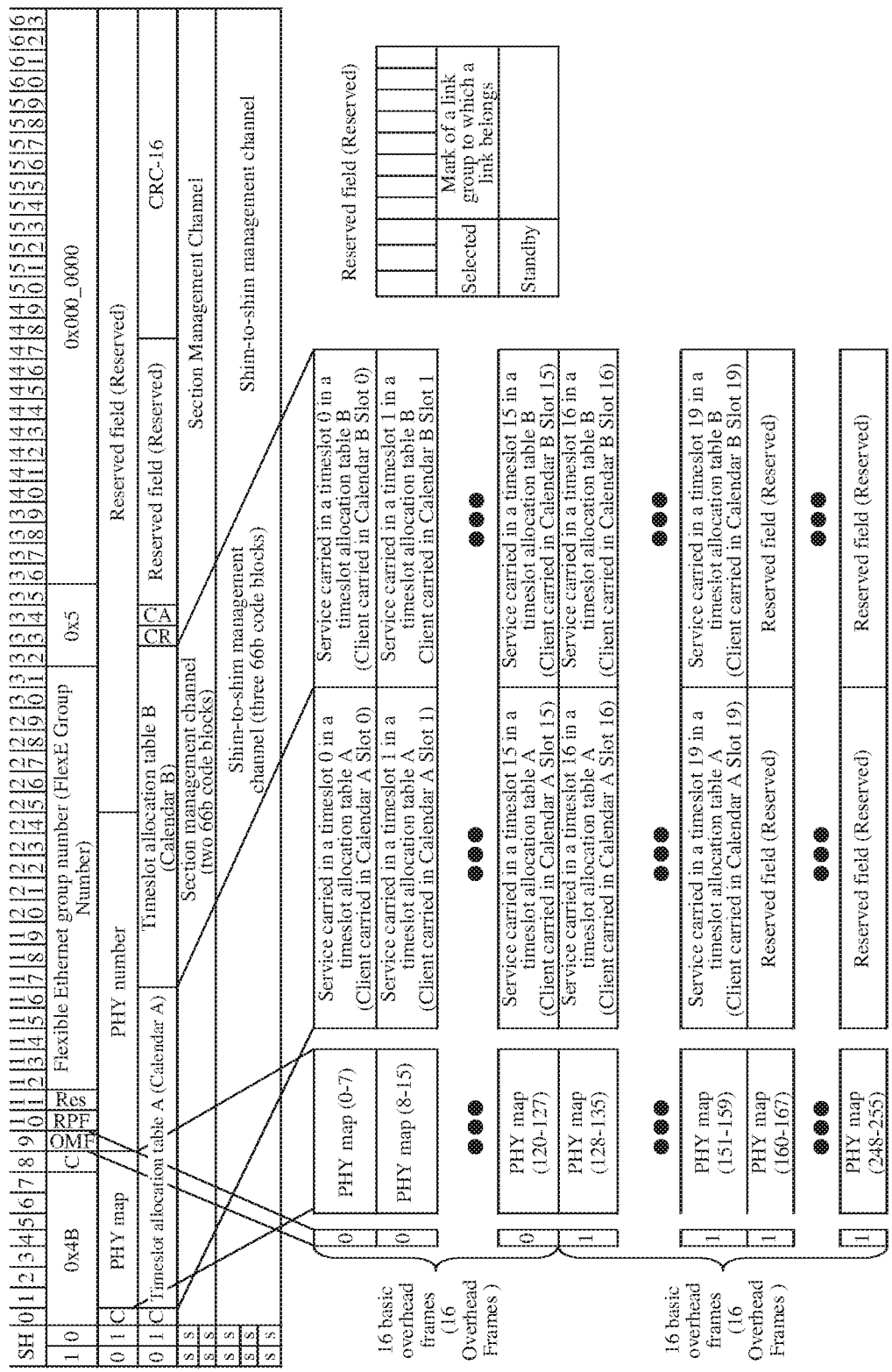
FIG. 10 is a schematic diagram of a process of link group configuration and compensation according to an embodiment of this application.

In another specific example, the first configuration information (for example, transmitting, on each link, a mark of a link group to which the link belongs) is transmitted using a reserved field of an OH code block. A first part of bits in the first configuration information is used to indicate that the first link and another link constitute the first link group, and a second part of bits in the first configuration information is a mark of the first link group. FIG. 10 is a schematic diagram of a format of a reserved field according to this embodiment. Further, 11 bits may be selected from the reserved field of the OH code block to carry the first configuration information. The first three bits may carry the "selected" or "standby" mark, and subsequent eight bits may be used to carry "the mark of the link group to which the link belongs" in a "selected" status. It should be understood that the first part of bits including the three bits and the second part of bits including the eight bits are merely an example. The first part of bits and the second part of bits may include more or fewer bits. This is not limited in this embodiment of this application.

It should be understood that the OH code block includes a reserved field of a plurality of bits. A position of the reserved field, used to carry the first configuration information, shown in FIG. 10 is merely an example, but is not intended to limit the embodiments of this application.

For the FlexO, configuration information corresponding to each link may be placed in a management channel of an OH code block of an OTUCn frame for sending, may be placed at a 0 byte of a general communication channel (GCC) and be sent in a generic framing procedure (GFP) format, an HDLC format, or a PPP format, or using a reserved (also referred to as RES) field in a self-defined frame format, or may be placed in an OTUCn frame payload, for example, in a payload of an optical payload unit Cn (OPUCn), and be sent in a GFP format or another self-defined frame format.

In this embodiment, the receive end device has the delayed-receiving compensation capability, and the receive end device acts as the decision device and determines the link group configuration. In this way, execution is easy and simple, and signaling overheads during link group configuration are small.

Embodiment 2

In this embodiment, the first device, namely a decision device, is the source end device, and the second device is the receive end device. The receive end device has a delayed-receiving compensation capability.

In this embodiment, in step S110, obtaining, by a first device, first status information of M links between a source end device and a receive end device may include receiving, by the first device, the first status information sent by the receive end device. In step S120, obtaining, by the first device, first capability information of the receive end device may include receiving, by the first device, the first capability information sent by the receive end device.

Figure 11:
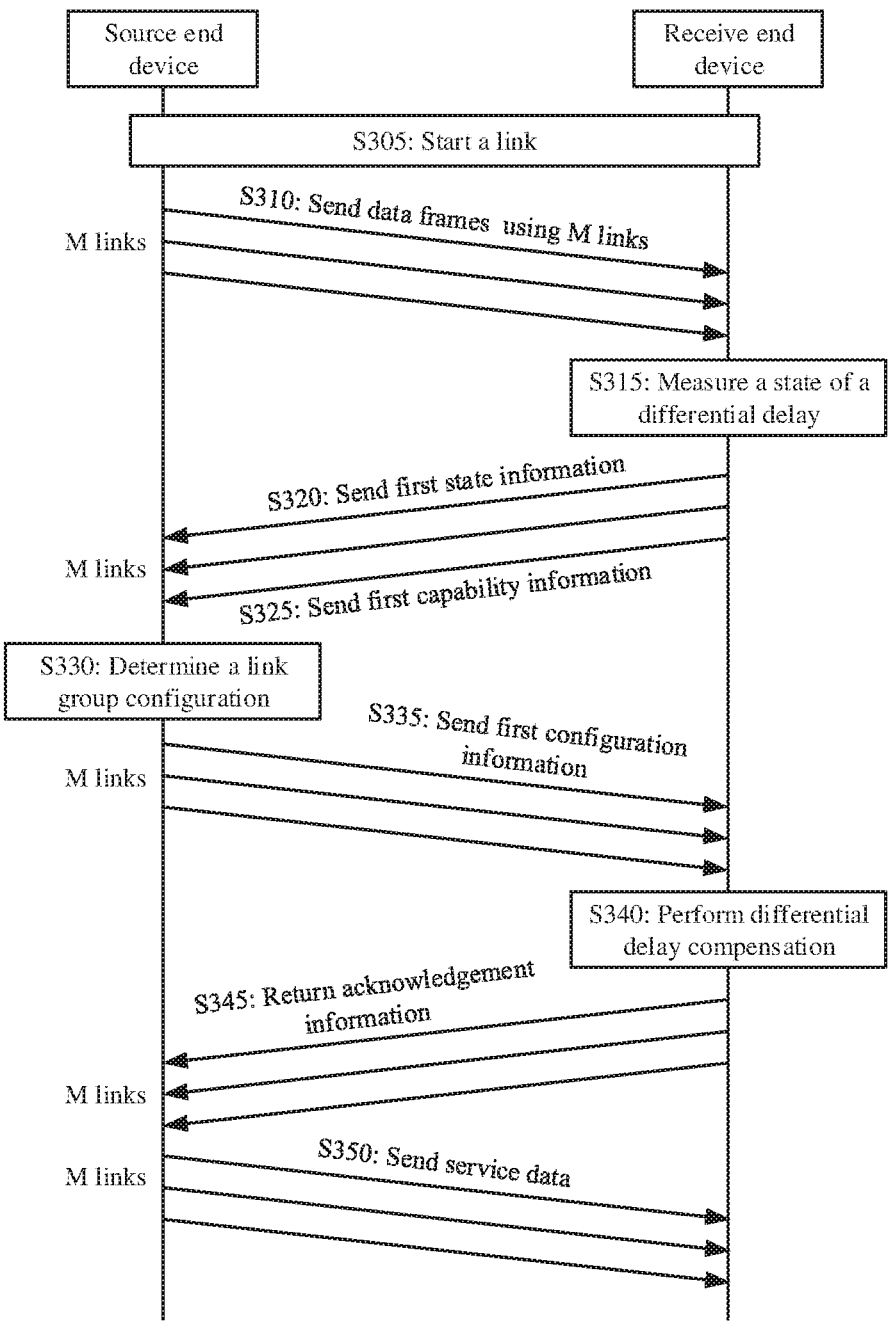
FIG. 11 is a schematic diagram of a process of link group configuration and compensation according to an embodiment of this application.

FIG. 11 is a schematic diagram of a process 300 of link group configuration and compensation according to this embodiment. The process 300 may include the following steps.

Step S305: Start the link between the source end device and the receive end device.

Step S310: The source end device separately sends data frames to the receive end device using the M links independently. Correspondingly, the receive end device receives the data frames sent by the source end device. It should be understood that the data frames may include an alignment mark.

Step S315: The receive end device measures a status of a differential delay between the M links.

Step S320: The receive end device sends the first status information to the source end device, where the first status information is used to indicate the status of the differential delay between the M links. Correspondingly, the source end device receives the first status information sent by the receive end device.

Step S325: The receive end device sends the first capability information to the source end device, where the first capability information is used to indicate the first capability of performing differential delay compensation on the M links by the receive end device. Correspondingly, the source end device receives the first capability information sent by the receive end device.

Step S330: The source end device determines a link group configuration based on the first status information and the first capability information. The configuration includes grouping the N of the M links into the first link group.

Step S335: The source end device sends the first configuration information to the receive end device, where the first configuration information includes the information used to indicate the first link group. Correspondingly, the receive end device receives the first configuration information sent by the source end device.

Step S340: The receive end device performs differential delay compensation on the M links. The receive end device performs differential delay compensation, that is, sets a differential delay buffer size, based on the first configuration information. That is, the receive end device performs differential delay compensation on the links in the first link group based on the link group configuration determined by the receive end device.

Step S345: The receive end device returns acknowledgement information to the source end device to indicate that the first configuration information is received and corresponding link group configuration is performed. Correspondingly, the source end device receives the acknowledgement information returned by the receive end device. It should be understood that step S345 is an optional step. Further, the receive end device may further send, to the source end device, an updated status of a differential delay between the links.

Step S350: The source end device sends service data to the receive end device based on the first configuration information.

A manner of sending the first configuration information may be similar to a manner of sending the first configuration information in Embodiment 1. Details are not described herein again.

Optionally, in step S335, the first configuration information may further include a buffer requirement of each link for differential delay compensation to be performed by the receive end device. The receive end device may directly set a buffer volume of each link based on the buffer requirement.

Optionally, in step S330, the source end device may further determine a link group configuration solution with reference to related information of the service data to be sent to the receive end device, for example, comprehensive factors such as a service volume and/or bandwidth.

It should be understood that, in step S345, the acknowledgement information returned by the receive end device may be transmitted in a form of an LLDP-format packet, or may be transmitted using a reserved field in an OH code block. For example, a two-bit reserved field after the OH reserved field that carries the first configuration information in Embodiment 1 may be used for transmitting the acknowledgement information. For example, "00" indicates that the receive end device receives the first configuration information and successfully sets the buffer volume of each link, and "01" indicates that the buffer volume of each link is not successfully set. The source end device may send the service data after receiving the acknowledgment information "00". If receiving a "01" message, the source end device returns to S330 and re-determines a link group configuration solution.

In step S325, the first capability information may be sent using a data code block, may be sent through a management channel of an overhead code block using a packet in an LLDP format, an HDLC format, or a PPP format, or may be sent using a reserved field of an overhead code block. This is not limited in this embodiment.

In a specific example, the first capability information may be carried in an LLDP-format TLV unit of a management channel of an overhead code block. A definition of each field of the LLDP-format TLV unit used to carry the first capability information is shown in Table 3.

Definitions of fields of bytes 1 to 6 in Table 3 are the same as definitions of fields of bytes 1 to 6 in Table 2.

A byte 7 defines a capability of performing differential delay compensation on the link. The first bit in the byte 7 may represent a capability of performing differential delay compensation on the link in a receiving direction. When a value of the first bit is "0", it indicates that a buffer size in the receiving direction is a default value, for example, 469 code blocks corresponding to a 300 ns differential delay compensation capability defined in the FlexE 1.0. When a value of the first bit is "1", it indicates that a buffer size in the receiving direction is a value self-defined by the link, and a specific value is described in bytes 8 to 10. Another bit in the byte 7 may be a reserved field.

The bytes 8 to 10 define a buffer size of the link in the receiving direction. If the first bit in the byte 7 is "1" (the buffer size in the receiving direction is the self-defined value), a value x of the bytes 8 to 10 indicates that the buffer size in the receiving direction is x code blocks, where a value range of x is [1 to 0xFFFFFE]. If the first bit in the byte 7 is "0", the buffer size in the receiving direction is the default value, and a value of the bytes 8 to 10 may be set to "0xFFFFFF".

It should be understood that the buffer size in the receiving direction (for example, a local deskew buffer size) defined by the bytes 8 to 10 in the TLV unit is an optional parameter. When the buffer size of the link in the receiving direction is a default size, information about the buffer size in the receiving direction does not need to be transferred, and a parameter thereof may be set to "0xFFFFFF".

The buffer size in the receiving direction described herein as an example uses a code block (block) as a unit. Similarly, the buffer size in the receiving direction may be represented in different description manners such as ns, 10 ns, or bytes, or in a different-size basic buffer unit. This is not limited in the embodiments of this application.

In a transmission mode of FlexE aware transport, namely, a cross-transport-network transmission scenario, the receive end device informs the source end device of the first capability using the TLV unit, and performs transmission through a shim-to-shim management channel of an OH code block. In another scenario, the TLV unit may be transmitted through a section management channel, or may be transmitted through a shim-to-shim management channel.

TABLE 3

LLDP-format TLV unit used to carry the first capability information
Byte:

| 1 | 2 | 3 to 5 | 6 | 7 | 8 to 10 |
|---|---|---|---|---|---|
| Type = 127 (7 bits) | Length (9 bits) | OUI: 00-0F-40 | Subtype: 0x?? (1 byte) | Differential delay compensation capability (1 byte) | Buffer size in a receiving direction (3 bytes) |

In a specific example, the first status information may be carried in an LLDP-format TLV unit of a management channel of an overhead code block. A definition of each field of the LLDP-format TLV unit used to carry the first status information is shown in Table 4.

Definitions of fields of bytes 1 to 6 in Table 4 are the same as definitions of fields of bytes 1 to 6 in Table 2.

A byte 7 defines a result of differential delay compensation performed on the link (for example, the result may be "FlexE group PHY deskew status"). The first bit in the byte 7 represents a result of a current differential delay performed on the link in a receiving direction. "0" indicates that the receive end device performs differential delay compensation on each of the M links based on the first configuration information, and differential delay compensation succeeds. "1" indicates that the receive end device does not perform differential delay compensation or differential delay compensation fails. Another bit in the byte 7 may be a reserved field.

Bytes 8 to 10 define a delay amount of a differential delay of the link. A delay amount (for example, "FlexE group PHY skew") parameter of a differential delay represents that when the receive end device receives a data frame on each link, a delay amount of the link relative to a link on which transmission is quickest in the M links. In this case, for example, when "FlexE group PHY skew" of a link is 0, it indicates that the link is the link on which transmission is quickest in the M links. A value x of the parameter represents a transmission time corresponding to a case in which the delay amount of the differential delay is data of x code blocks.

In a transmission mode of FlexE aware transport, namely, a cross-transport-network transmission scenario, the receive end device informs the source end device of a differential-delay status of the receive end device using the TLV unit, and performs transmission through a shim-to-shim management channel of an OH code block. In another scenario, the TLV unit may be transmitted through a section management channel, or may be transmitted through a shim-to-shim management channel.

TABLE 4

LLDP-format TLV unit used to carry the first capability information
Byte:

| 1 | 2 | 3 to 5 | 6 | 7 | 8 to 10 |
|---|---|---|---|---|---|
| Type = 127 (7 bits) | Length (9 bits) | OUI: 00-0F-40 | Subtype: 0x?? (1 byte) | Differential delay result (1 byte) | Delay amount of a differential delay (3 bytes) |

The source end device determines the link group configuration after obtaining the first capability information of the receive end device and the first status information of the links using the foregoing two TLV units, and sends the first configuration information to the receive end device in a manner similar to that in Embodiment 1. The receive end device performs differential delay compensation on the links based on the first configuration information. Details are not described herein again.

In this embodiment, the receive end device has the delayed-receiving compensation capability, and the source end device acts as the decision device, and may determine the link group configuration with reference to related information of service data, for example, comprehensive factors such as a service volume and/or bandwidth.

Embodiment 3

In this embodiment, the first device, namely a decision device, is a management device, and the second device includes the receive end device and/or the source end device. The receive end device has a delayed-receiving compensation capability.

In this embodiment, in step S110, obtaining, by a first device, first status information of M links between a source end device and a receive end device may include receiving, by the first device, the first status information sent by the receive end device. In step S120, obtaining, by the first device, first capability information of the receive end device may include receiving, by the first device, the first capability information sent by the receive end device.

A process of determining, by the management device, a link group configuration may include the following steps.

Step A-1: Start the link between the source end device and the receive end device.

Step A-2: The source end device separately sends data frames to the receive end device using the M links independently. Correspondingly, the receive end device receives the data frames sent by the source end device. It should be understood that the data frames may include an alignment mark.

Step A-3: The receive end device measures a status of a differential delay between the M links.

Step A-4: The receive end device sends the first status information to the management device, where the first status information is used to indicate the status of the differential delay between the M links. Correspondingly, the management device receives the first status information sent by the receive end device.

Step A-5: The receive end device sends the first capability information to the management device, where the first capability information is used to indicate the first capability of performing differential delay compensation on the M links by the receive end device. Correspondingly, the management device receives the first capability information sent by the receive end device.

Step A-6: The management device determines a link group configuration based on the first status information and the first capability information. Further, the configuration includes grouping the N of the M links into the first link group.

Step A-7: The management device sends the first configuration information to the source end device and the receive end device, where the first configuration information includes the information used to indicate the first link group. Correspondingly, the source end device and the receive end device receive the first configuration information sent by the management device.

Step A-8: The source end device and/or the receive end device may return acknowledgement information to the management device, to indicate that the first configuration information is received and corresponding configuration is performed. Correspondingly, the management device receives the acknowledgement information returned by the source end device and/or the receive end device. It should be understood that step A-8 is an optional step.

Step A-9: The management device delivers, to the source end device after receiving the acknowledgement information, an indication indicating that link group configuration is completed. It should be understood that A-9 is an optional step.

Step A-10: The source end device sends service data to the receive end device based on the first configuration information.

Step A-11: The receive end device performs, based on the first configuration information, differential delay compensation on a link, in the first link group, corresponding to the service data.

Step A-12: The receive end device directly sets a buffer volume of each link based on a buffer requirement, where the first configuration information sent by the management device to the receive end device may further include the buffer requirement of each link for differential delay compensation to be performed by the receive end device. It should be understood that step A-12 is an optional step.

It should be understood that communication, between the source end device and the receive end device and the management device, about the first status information, the first capability information, and the first configuration information may be performed through a management channel of an OH code block of the devices and the management device. Optionally, in a FlexO, the foregoing information may be transmitted using a GCC0 byte of the OH code block in a GFP format, an HDLC format, or a PPP format, or using an RES field in a self-defined frame format. In a FlexE, the foregoing information may be transmitted in a form of an internet protocol (IP) packet through the management channel of the OH code block. A specific transmission manner is not limited in this embodiment.

In this embodiment, the management device acts as the decision device. In this way, the management device can receive related information of the source end device and the receive end device, and can determine the link group configuration in consideration of comprehensive factors such as a service volume and/or bandwidth. In addition, this can avoid a computing amount possibly resulting from decision-making of the source end device or the receive end device, and can reduce load of the source end device and the receive end device.

It should be understood that a link may further pass through some intermediate devices on a path from the source end device to the receive end device in an actual scenario, for example, an application scenario of FlexE cross-transport-network transmission shown in FIG. 5, that is, a transmission scenario based on a FlexE aware transport mode. In addition to the receive end device that can perform differential delay compensation, each transmit port of the intermediate device may support a capability of delaying data sending, namely, a delayed-sending compensation capability. Therefore, the receive end device and the intermediate device needs to perform negotiation to implement collaborative compensation.

In some embodiments of this application, K upstream devices of the receive end device on the M links may have a delayed-sending compensation capability, where K is a positive integer. The K upstream devices may include the source end device and/or at least one intermediate device, and the intermediate device is located between the source end device and the receive end device on the M links.

When the K upstream devices of the receive end device have the delayed-sending compensation capability, the method 100 may further include obtaining, by the first device, second capability information and second status information of each of the K upstream devices, where the second capability information is used to indicate a second capability of performing delayed-sending compensation on at least one of the M links by each upstream device, and the second status information is used to indicate a current status of delayed-sending compensation performed on the at least one of the M links by each upstream device, in step S130, grouping, by the first device, N of the M links into a first link group based on the first status information and the first capability information may include grouping, by the first device, the N of the M links into the first link group based on the first status information, the first capability information, the second status information, and the second capability information, and the method 100 may further include determining, by the first device based on the first status information, the first capability information, the second status information, and the second capability information, a configuration of delayed-sending compensation that each upstream device needs to perform on a corresponding link.

It should be noted that not all of the M links pass through all upstream devices. For any one of the K upstream devices, it is possible that only some (at least one) of the M links pass through the upstream device.

The following describes, with reference to several embodiments, the link group configuration method in the embodiments of this application when the K upstream devices of the receive end device have the delayed-sending compensation capability.

In Embodiment 4, Embodiment 5, and Embodiment 6, the first device, namely a decision device, is the receive end device, and the second device is the source end device. The receive end device has a delayed-receiving compensation capability. The K upstream devices may include the source end device and/or at least one intermediate device, and have the delayed-sending compensation capability.

In step S110, obtaining, by a first device, first status information of M links between a source end device and a receive end device may include measuring, by the first device, a differential delay between the M links, to obtain the first status information, obtaining, by the first device, second capability information and second status information of each of the K upstream devices may include receiving, by the first device, the second capability information and the second status information that are sent by each upstream device, and the method 100 may further include sending, by the first device, second configuration information to at least one of the K upstream devices, where the second configuration information is used to indicate a configuration of delayed-sending compensation that the at least one upstream device needs to perform on a corresponding link.

After the at least one upstream device completes configuration of delayed-sending compensation, the method 100 may further include performing, by the first device, service data transmission with the second device based on the first link group, and performing, by the first device based on the first configuration information, differential delay compensation on a link, in the first link group, on which the at least one upstream device has performed delayed-sending compensation based on the second configuration information.

It should be understood that, when the M links cannot be aligned on the receive end device, the M links cannot constitute a link group, to be specific, a FlexE group or a FlexO group crashes and cannot work. The source end device, the receive end device, the intermediate device, and the like in the embodiments of this application may all have a differential delay compensation capability or a delayed-sending compensation capability. The devices in the embodiments of this application implement link group compensation through capability negotiation. When a compensation capability of each device in the FlexE group or the FlexO group between the source end device and the receive end device is insufficient to compensate a differential delay between links, a link group is configured such that the source end device performs cross-link service data transmission only on delay-aligned links. Alternatively, devices perform collaborative compensation such that the M links can be aligned on the receive end device finally. This can ensure working of the FlexE group or the FlexO group, and can improve link utilization.

Embodiment 4

In this embodiment, the first device, namely a decision device, is the receive end device, and the second device is the source end device. The receive end device has a delayed-receiving compensation capability. Between the receive end device and the source end device, there is an intermediate device having a delayed-sending compensation capability. That is, the K upstream devices are the at least one intermediate device.

A process of collaborative compensation by the receive end device and the intermediate device may include the following steps.

Step B-1: Start the link between the source end device and the receive end device.

Step B-2: The source end device separately sends data frames to the receive end device using the M links independently. Correspondingly, the receive end device receives the data frames sent by the source end device. It should be understood that the data frames may include an alignment mark.

Step B-3: The receive end device measures a status of a differential delay between the M links to obtain the first status information.

Step B-4: The intermediate device sends the second capability information to the receive end device, where the second capability information is used to indicate a second capability of performing delayed-sending compensation on at least one of the M links by each intermediate device. Correspondingly, the receive end device receives the second capability information sent by the intermediate device. It should be understood that the second capability information may be carried in the data frame in B-2, or may be sent in another manner. This is not limited in this embodiment.

Step B-5: The intermediate device sends the second status information to the receive end device, where the second status information is used to indicate a current status of delayed-sending compensation performed on the at least one of the M links by each intermediate device. Correspondingly, the receive end device receives the second status information sent by the intermediate device. It should be understood that the second status information may be carried in the data frame in step B-2, or may be sent in another manner. This is not limited in this embodiment.

Step B-6: The receive end device determines a link group configuration and a delayed-sending compensation configuration based on the first status information, the first capability information that can represent the capability of performing differential delay compensation on the M links by the receive end device, the second capability information, and the second status information. A specific link group configuration includes grouping the N of the M links into the first link group.

Step B-7: The receive end device sends the first configuration information to the intermediate device, where the first configuration information includes the information used to indicate the first link group. Correspondingly, the intermediate device receives the first configuration information sent by the receive end device. It should be understood that step B-7 is an optional step, and step B-7 may be performed for another process instead of a collaborative compensation process.

Step B-8: The receive end device sends the second configuration information to the intermediate device, where the second configuration information includes information used to indicate a configuration of delayed-sending compensation that the upstream device needs to perform on a corresponding link. Correspondingly, the intermediate device receives the second configuration information sent by the receive end device.

Step B-9: The intermediate device adjusts a sending delay of a link based on the second configuration information.

Step B-10: The intermediate device sends, to the receive end device, information about an updated current status of delayed-sending compensation. In this way, preparation can be made for next collaborative compensation, and the receive end device is informed that configuration of delayed-sending compensation is completed.

Step B-11: The receive end device sends the first configuration information to the source end device after receiving the information sent by the intermediate device, where the first configuration information includes the information used to indicate the first link group. Correspondingly, the source end device receives the first configuration information sent by the receive end device. In addition, optionally, the first configuration information may further include information used to indicate that related configuration of differential delay compensation is completed.

Step B-12: The receive end device performs differential delay compensation on the M links. Further, the receive end device performs differential delay compensation, that is, sets a differential delay buffer size, based on the first configuration information. That is, the receive end device performs differential delay compensation on the links in the first link group based on the link group configuration determined by the receive end device.

Step B-13: The source end device sends service data to the receive end device based on the first configuration information.

It should be understood that communication, between the source end device, the intermediate device, and the receive end device, about the first status information, the first capability information, the first configuration information, the second status information, the second capability information, the second configuration information, and other related information may be performed using a data code block, may be performed through a management channel of an overhead code block using a packet in an LLDP format, an HDLC format, or a PPP format, or may be performed using a reserved field of an overhead code block. This is not limited in this embodiment.

A manner of sending the first configuration information is similar to a manner of sending the first configuration information in Embodiment 1. Details are not described herein again.

In this embodiment and other embodiments of this application, for reporting or transmission of capability information of a device, for example, the first capability information and the second capability information, such capability information may be carried in an LLDP-format TLV unit of a management channel of an overhead code block. A definition of each field of the LLDP-format TLV unit used to carry the capability information is shown in Table 5.

Definitions of fields of bytes 1 to 6 in Table 5 are the same as definitions of fields of bytes 1 to 6 in Table 2.

A byte 7 defines a capability of performing compensation on the link. The first bit in the byte 7 may represent a capability of performing differential delay compensation on the link in a receiving direction. When a value of the first bit is "0", it indicates that a buffer size in the receiving direction is a default value, for example, 469 code blocks corresponding to a 300 ns differential delay compensation capability defined in the FlexE 1.0. When a value of the first bit is "1", it indicates that a buffer size in the receiving direction is a value self-defined by the link, and a specific value is described in bytes 8 to 10. The second bit in the byte 7 may represent a capability of performing delayed-sending compensation on the link in the receiving direction. When a value of the second bit is "0", it indicates a default mode in which a delayed-sending compensation capability is not supported. When a value of the second bit is "1", it indicates that a delayed-sending compensation capability is supported, and a specific value of a delayed-sending buffer size is described in bytes 11 to 13. Another bit in the byte 7 may be a reserved field.

The bytes 8 to 10 define a buffer size of the link in the receiving direction. If the first bit in the byte 7 is "1" (the buffer size in the receiving direction is the self-defined value), a value x of the bytes 8 to 10 indicates that the buffer size in the receiving direction is x code blocks, where a value range of x is [1 to 0xFFFFFE]. If the first bit in the byte 7 is "0", the buffer size in the receiving direction is the default value, and a value of the bytes 8 to 10 may be set to "0xFFFFFF".

The bytes 11 to 13 define a buffer size of the link in a sending direction. If the first bit in the byte 7 is "1" (the delayed-sending compensation capability is supported in the sending direction), a value x of the bytes 8 to 10 indicates that the buffer size in the sending direction is x code blocks, where a value range of x is [1 to 0xFFFFFE]. If the first bit in the byte 7 is "0", it indicates that the delayed-sending compensation capability is not supported in the sending direction, and a value of the bytes 8 to 10 may be set to "0xFFFFFF".

The buffer size described herein as an example uses a code block (block) as a unit. Similarly, the buffer size may be represented in different description manners such as ns, 10 ns, or bytes, or in a different-size basic buffer unit. This is not limited in the embodiments of this application.

In a transmission mode of FlexE aware transport, namely, a cross-transport-network transmission scenario, the devices inform each other of the capabilities using the TLV unit, and perform transmission through a shim-to-shim management channel of an OH code block. In another scenario, the TLV unit may be transmitted through a section management channel, or may be transmitted through a shim-to-shim management channel.

TABLE 5

| LLDP-format TLV unit used to carry the capability information | | | | | | |
|---|---|---|---|---|---|---|
| Byte: | | | | | | |
| 1 | 2 | 3 to 5 | 6 | 7 | 8 to 10 | 11 to 13 |
| Type = 127 (7 bits) | Length (9 bits) | OUI: 00-0F-40 | Subtype: 0x?? (1 byte) | Link compensation capability (1 byte) | Buffer size in a receiving direction (3 bytes) | Buffer size in a sending direction (3 bytes) |

It should be noted that, in all the embodiments of this application, the capability information may be carried using the TLV unit shown in Table 5. A link is usually bidirectional. Therefore, a device is a receive end device in a transmission direction, and the device is a source end device or an upstream device in another transmission direction. In this embodiment, the TLV unit used to carry the capability information is designed in a form shown in Table 5 such that the device can use the TLV unit to report the capability information, regardless of whether the device acts as the receive end device or acts as the source end device or the upstream device.

That is, the TLV unit, shown in Table 5, in an LLDP format of a management channel of an overhead code block may carry the first capability information used to indicate the first capability of performing differential delay compensation on the M links by the receive end device, and can also carry information used to indicate a capability of performing delayed-sending compensation on the M links by the receive end device when the receive end device sends service data to the source end device.

In this embodiment and other embodiments of this application, for reporting or transmission of status information of a device, for example, the first status information and the second status information, such status information may be carried in an LLDP-format TLV unit of a management channel of an overhead code block. A definition of each field of the LLDP-format TLV unit used to carry the status information is shown in Table 6.

Definitions of fields of bytes 1 to 6 in Table 6 are the same as definitions of fields of bytes 1 to 6 in Table 2.

A byte 7 defines a current status of differential delay compensation performed on the link and a current status of delayed-sending compensation performed on the link, that is, a link compensation status. The first bit in the byte 7 represents a current status of differential delay compensation performed on the link in a receiving direction. When a value of the first bit is "0", it indicates that differential delay compensation performed on the link in the receiving direction succeeds. For example, in a reserved field of the OH code block, the link is marked as "selected", and a "subgroup ID" is "3". In this case, it indicates that differential delay compensation performed on the link succeeds, compared with that performed on another link in a subgroup 3. When a value of the first bit is "1", it indicates that differential delay compensation performed on the link in the receiving direction fails. For example, in a reserved field of the OH code block, the link is marked as "selected", and a "subgroup ID" is "3". In this case, it indicates that differential delay compensation performed on the link fails, compared with that performed on another link in a subgroup 3, and the link exceeds a differential delay compensation capability of a device. A differential delay amount is described in bytes 8 to 10. The second bit in the byte 7 represents a current status of delayed-sending compensation performed on the link in a sending direction. When a value of the second bit is "0", it indicates absence of a delayed-sending capability for the link in the sending direction. When a value of the second bit is "1", it indicates that a delayed-sending capability for the link is being used in the sending direction. A delayed-sending amount is described in bytes 11 to 13. Another bit in the byte 7 is a reserved field.

The bytes 8 to 10 define a differential delay amount by which the link exceeds the differential delay compensation capability in the receiving direction when differential delay compensation performed on the link in the receiving direction fails. A value x of the differential delay amount indicates that the exceeded differential delay amount is a transmission time corresponding to a buffer size of x code blocks. When differential delay compensation in the receiving direction succeeds, x is 0.

The bytes 11 to 13 define a delayed-sending amount of the link. A value x of the delayed-sending amount indicates that a currently-used delayed-sending buffer size is x code block. When the second bit in the byte 7 is "0" (no delayed-sending capability for the link in the sending direction), a value of x is "0xFFFFFF".

The buffer size described herein as an example uses a code block (block) as a unit. Similarly, the buffer size may be represented in different description manners such as ns, 10 ns, or bytes, or in a different-size basic buffer unit. This is not limited in the embodiments of this application.

In a transmission mode of FlexE aware transport, namely, a cross-transport-network transmission scenario, the devices inform each other of the statuses using the TLV unit, and perform transmission through a shim-to-shim management channel of an OH code block. In another scenario, the TLV unit may be transmitted through a section management channel, or may be transmitted through a shim-to-shim management channel.

TABLE 6

| LLDP-format TLV unit used to carry the status information Byte: | | | | | | |
|---|---|---|---|---|---|---|
| 1 | 2 | 3 to 5 | 6 | 7 | 8 to 10 | 11 to 13 |
| Type = 127 (7 bits) | Length (9 bits) | OUI: 00-0F-40 | Subtype: 0x?? (1 byte) | Link compensation status (1 byte) | Differential delay amount (3 bytes) | Delayed-sending amount (3 bytes) |

It should be noted that, in all the embodiments of this application, the status information may be carried using the TLV unit shown in Table 6. A link is usually bidirectional. Therefore, a device is a receive end device in a transmission direction, and the device is a source end device or an upstream device in another transmission direction. In this embodiment, the TLV unit used to carry the status information is designed in a form shown in Table 6 such that the device can use the TLV unit to report the status information, regardless of whether the device acts as the receive end device or acts as the source end device or the upstream device.

That is, the TLV unit, shown in Table 6, in an LLDP format of a management channel of an overhead code block may carry the first status information used to indicate the status of the differential delay between any two of the M links, and can also carry information used to indicate a current status of delayed-sending compensation performed on the M links by the receive end device when the receive end device sends service data to the source end device.

In addition, after the decision device determines the second configuration information, the TLV unit shown in Table 6 may further be used to carry the second configuration information. To be specific, the TLV unit can further carry information that is used to indicate a configuration of delayed-sending compensation that an upstream device needs to perform on a corresponding link.

A manner of sending the first configuration information may be similar to a manner of sending the first configuration information in Embodiment 1. Details are not described herein again. In addition, in this embodiment and other embodiments of this application, for reporting or transmission of status information of a device and delivery of configuration information, for example, the first status information, the second status information, the first configuration information, and the second configuration information, such information may be carried together in an LLDP-format TLV unit of a management channel of an overhead code block. A definition of each field of the LLDP-format TLV unit used to carry the status information and the configuration information is shown in Table 7.

Definitions of fields of bytes 1 to 6 in Table 7 are the same as definitions of fields of bytes 1 to 6 in Table 2.

Bytes 7 and 8 define a compensation status of the link and a link group configuration. The first bit in the byte 7 represents a current status of differential delay compensation performed on the link in a receiving direction. When a value of the first bit is "0", it indicates that differential delay compensation performed on the link in the receiving direction succeeds. For example, in a field subsequent to the bytes 7 and 8, the link is marked as "selected", and a "subgroup ID" is "3". In this case, it indicates that differential delay compensation performed on the link succeeds, compared with that performed on another link in a subgroup 3. When a value of the first bit is "1", it indicates that differential delay compensation performed on the link in the receiving direction fails. For example, in a field subsequent to the bytes 7 and 8, the link is marked as "selected", and a "subgroup ID" is "3". In this case, it indicates that differential delay compensation performed on the link fails, compared with that performed on another link in a subgroup 3, and the link exceeds a differential delay compensation capability of a device. A differential delay amount is described in bytes 9 to 11. The second bit in the byte 7 represents a current status of delayed-sending compensation performed on the link in a sending direction. When a value of the second bit is "0", it indicates absence of a delayed-sending capability for the link in the sending direction, or that a delayed-sending capability is not used in the sending direction. When a value of the second bit is "1", it indicates that a delayed-sending capability for the link is being used in the sending direction. A delayed-sending amount is described in bytes 12 to 14. Another bit in the byte 7 is a reserved field.

The third to the 13th bits in the bytes 7 and 8 are used to represent a link group to which the link belongs, that is, mark information of the link. The second to the fourth bits are used to represent "selected" or "standby". For example, "001" represents "selected", and "010" represents "standby". In a "selected" status, subsequent eight bits may be used to represent a "subgroup ID". Another bit in the bytes 7 and 8 is a reserved field.

The differential delay amount described by the bytes 9 to 11 in Table 7 is the same as the differential delay amount described by the bytes 8 to 10 in Table 6, and the delayed-sending amount described by the bytes 12 to 14 in Table 7 is the same as the delayed-sending amount described by the bytes 11 to 13 in Table 6. Details are not described herein again.

TABLE 7

| | | | | LLDP-format TLV unit used to carry the status information Byte: | | | |
|---|---|---|---|---|---|---|---|
| 1 | 2 | 3 to 5 | 6 | 7 to 8 | 9 to 11 | 12 to 14 |
| Type = 127 (7 bits) | Length (9 bits) | OUI: 00-0F-40 | Subtype: 0x?? (1 byte) | Link compensation status and a link group configuration (2 bytes) | Differential delay amount (3 bytes) | Delayed-sending amount (3 bytes) |

Embodiment 5

In this embodiment, the first device, namely a decision device, is the receive end device, and the second device is the source end device. The receive end device has a delayed-receiving compensation capability. The source end device has a delayed-sending compensation capability, that is, the K upstream devices are the source end device.

A process of determining, by the receive end device, a link group configuration and performing, by the receive end device and the source end device, collaborative compensation may include the following steps.

Step C-1: Start the link between the source end device and the receive end device.

Step C-2: The source end device separately sends data frames to the receive end device using the M links independently. Correspondingly, the receive end device receives the data frames sent by the source end device. It should be understood that the data frames may include an alignment mark.

Step C-3: The source end device sends the second capability information to the receive end device, where the second capability information is used to indicate a second capability of performing delayed-sending compensation on at least one of the M links by the source end device. Correspondingly, the receive end device receives the second capability information sent by the source end device. It should be understood that the second capability information may be carried in the data frame in step C-2, or may be sent in another manner. This is not limited in this embodiment.

Step C-4: The source end device sends the second status information to the receive end device, where the second status information is used to indicate a current status of delayed-sending compensation performed on the at least one of the M links by the source end device. Correspondingly, the receive end device receives the second status information sent by the source end device. It should be understood that the second status information may be carried in the data frame in step C-2, or may be sent in another manner. This is not limited in this embodiment.

Step C-5: The receive end device measures a status of a differential delay between the M links to obtain the first status information.

Step C-6: The receive end device determines a link group configuration and a delayed-sending compensation configuration based on the first status information, the first capability information that can represent the capability of performing differential delay compensation on the M links by the receive end device, the second capability information, and the second status information. A specific link group configuration includes grouping the N of the M links into the first link group.

Step C-7: The receive end device sends the first configuration information to the source end device, where the first configuration information includes the information used to indicate the first link group. Correspondingly, the source end device receives the first configuration information sent by the receive end device.

Step C-8: The receive end device sends the second configuration information to the source end device, where the second configuration information includes information used to indicate a configuration of delayed-sending compensation that the source end device needs to perform on a corresponding link. Correspondingly, the source end device receives the second configuration information sent by the receive end device.

Step C-9: The source end device adjusts a sending delay of a link based on the second configuration information.

C-10: The source end device sends, to the receive end device, information about an updated status of delayed-sending compensation. In this way, preparation can be made for next collaborative compensation, and the receive end device is informed that configuration of delayed-sending compensation is completed.

Step C-11: After receiving the information sent by the source end device, the receive end device re-analyzes the differential delay between the links, and performs differential delay compensation on the M links. Further, the receive end device performs differential delay compensation, that is, sets a differential delay buffer size, based on the first configuration information. That is, the receive end device performs differential delay compensation on the links in the first link group based on the link group configuration determined by the receive end device. The receive end device feeds back, to the source end device, a status of a differential delay between the links and the link group configuration.

Step C-12: The source end device sends service data to the receive end device based on the first configuration information.

It should be understood that, between the source end device and the receive end device, a transmission format and transmission channel of at least one of the first status information, the first capability information, the first configuration information, the second status information, the second capability information, or the second configuration information are similar to those in Embodiment 4, and details are not described herein again.

Embodiment 6

In this embodiment, the first device, namely a decision device, is the receive end device, and the second device is the source end device. The receive end device has a delayed-receiving compensation capability. The source end device and at least one intermediate device have a delayed-sending compensation capability. That is, the K upstream devices include the source end device and the at least one intermediate device.

A process of collaborative compensation by the receive end device, the source end device, and the at least one intermediate device may include the following steps.

Step D-1: Start the link between the source end device and the receive end device.

Step D-2: The source end device separately sends data frames to the receive end device using the M links independently. Correspondingly, the receive end device receives the data frames sent by the source end device. It should be understood that the data frames may include an alignment mark.

Step D-3: The receive end device measures a status of a differential delay between the M links to obtain the first status information.

Step D-4: The source end device and the at least one intermediate device send the second capability information to the receive end device, where the second capability information is used to indicate the second capability of performing delayed-sending compensation on at least one of the M links by each upstream device. Correspondingly, the receive end device receives the second capability information sent by the source end device. It should be understood that the second capability information may be carried in the data frame in step D-2, or may be sent in another manner. This is not limited in this embodiment.

Step D-5: The source end device and the at least one intermediate device send the second status information to the receive end device, where the second status information is used to indicate the current status of delayed-sending compensation performed on the at least one of the M links by each upstream device. Correspondingly, the receive end device receives the second status information sent by the source end device. It should be understood that the second status information may be carried in the data frame in step D-2, or may be sent in another manner. This is not limited in this embodiment.

Step D-6: The receive end device determines a link group configuration and a delayed-sending compensation configuration based on the first status information, the first capability information that can represent the capability of performing differential delay compensation on the M links by the receive end device, the second capability information, and the second status information. A specific link group configuration includes grouping the N of the M links into the first link group.

Step D-7: The receive end device sends the first configuration information to the source end device, where the first configuration information includes the information used to indicate the first link group. Correspondingly, the source end device receives the first configuration information sent by the receive end device.

Step D-8: The receive end device sends the first configuration information to the intermediate device, where the first configuration information includes the information used to indicate the first link group. Correspondingly, the intermediate device receives the first configuration information sent by the receive end device. It should be understood that step D-8 is an optional step, and step D-8 may be performed for another process instead of a collaborative compensation process.

Step D-9: The receive end device sends the second configuration information to the source end device and the at least one intermediate device, where the second configuration information includes information used to indicate a configuration of delayed-sending compensation that the source end device and the at least one intermediate device need to separately perform on corresponding links. Correspondingly, the source end device and the at least one intermediate device each receive the second configuration information sent by the receive end device.

Step D-10: The source end device and the at least one intermediate device adjust a sending delay of a link, that is, set a delayed-sending buffer size, based on the second configuration information.

Step D-11: The source end device and the at least one intermediate device send, to the receive end device, information about an updated status of delayed-sending compensation. In this way, preparation can be made for next collaborative compensation, and the receive end device is informed that configuration of delayed-sending compensation is completed.

Step D-12: The receive end device re-analyzes the differential delay between the links, and performs differential delay compensation on the M links. Further, the receive end device performs differential delay compensation, that is, sets a differential delay buffer size, based on the first configuration information. That is, the receive end device performs differential delay compensation on the links in the first link group based on the link group configuration determined by the receive end device. The receive end device feeds back, to the source end device, a status of a differential delay between the links and the link group configuration.

Step D-13: The source end device sends service data to the receive end device based on the first configuration information.

It should be understood that, between the source end device and the receive end device, a transmission format and transmission channel of at least one of the first status information, the first capability information, the first configuration information, the second status information, the second capability information, or the second configuration information are similar to those in Embodiment 4, and details are not described herein again.

In Embodiment 7, Embodiment 8, and Embodiment 9, the first device, namely a decision device, is the source end device, and the second device is the receive end device. The receive end device has a delayed-receiving compensation capability. The K upstream devices may include the source end device and/or at least one intermediate device, and have the delayed-sending compensation capability.

In step S110, obtaining, by a first device, first status information of M links between a source end device and a receive end device may include receiving, by the first device, the first status information sent by the receive end device. In step S120, obtaining, by the first device, first capability information of the receive end device may include receiving, by the first device, the first capability information sent by the receive end device.

After the at least one upstream device completes configuration of delayed-sending compensation, the method 100 may further include performing, by the first device, service data transmission with the second device based on the first link group, and performing, by the first device based on the first configuration information, differential delay compensation on a link, in the first link group, on which the at least one upstream device has performed delayed-sending compensation based on the second configuration information.

Embodiment 7

In this embodiment, the first device, namely a decision device, is the source end device, and the second device is the receive end device. The receive end device has a delayed-receiving compensation capability. Between the receive end device and the source end device, there is an intermediate device having a delayed-sending compensation capability. That is, the K upstream devices are the at least one intermediate device.

Further, obtaining, by the first device, second capability information and second status information of each of the K upstream devices may include receiving, by the first device, the second capability information and the second status information that are sent by each of the at least one intermediate device, and the method 100 may further include sending, by the first device, second configuration information to at least some of the at least one intermediate device, where the second configuration information is used to indicate a configuration of delayed-sending compensation that the at least some intermediate devices need to perform on a corresponding link.

It should be understood that the sending, by the first device, second configuration information to at least some of the at least one intermediate device may be directly sending, by the first device, the second configuration information to the intermediate device, or may be sending, by the first device, the second configuration information to the receive end device such that the receive end device forwards the second configuration information to the intermediate device. That is, the first device may directly send or indirectly send the second configuration information to the intermediate device. This is not limited in this embodiment.

A process of collaborative compensation by the receive end device and the intermediate device may include the following steps.

Step E-1: Start the link between the source end device and the receive end device.

Step E-2: The source end device separately sends data frames to the receive end device using the M links independently. Correspondingly, the receive end device receives the data frames sent by the source end device. It should be understood that the data frames may include an alignment mark.

Step E-3: The receive end device measures a status of a differential delay between the M links.

Step E-4: The receive end device sends the first status information to the source end device, where the first status information is used to indicate the status of the differential delay between the M links. Correspondingly, the source end device receives the first status information sent by the receive end device. Optionally, the first status information may be transmitted through a shim-to-shim management channel of an OH code block in a FlexE.

Step E-5: The receive end device sends the first capability information to the source end device, where the first capability information is used to indicate the first capability of performing differential delay compensation on the M links by the receive end device. Correspondingly, the source end device receives the first capability information sent by the receive end device. Optionally, the first capability information may be transmitted through a shim-to-shim management channel of an OH code block in a FlexE.

Step E-6: The intermediate device sends the second capability information to the source end device, where the second capability information is used to indicate a second capability of performing delayed-sending compensation on at least one of the M links by each intermediate device. Correspondingly, the source end device receives the second capability information sent by the intermediate device. It should be understood that the second capability information may be carried in the data frame in step E-2, or may be sent in another manner. This is not limited in this embodiment. Optionally, the second capability information may be transmitted through a shim-to-shim management channel of an OH code block in a FlexE.

Step E-7: The intermediate device sends the second status information to the source end device, where the second status information is used to indicate a current status of delayed-sending compensation performed on the at least one of the M links by each intermediate device. Correspondingly, the source end device receives the second status information sent by the intermediate device. It should be understood that the second status information may be carried in the data frame in step E-2, or may be sent in another manner. This is not limited in this embodiment. Optionally, the second status information may be transmitted through a section management channel of an OH code block in a FlexE.

Step E-8: The source end device determines a link group configuration and a delayed-sending compensation configuration based on the first status information, the first capability information, the second capability information, and the second status information. A specific link group configuration includes grouping the N of the M links into the first link group.

Step E-9: The source end device sends the first configuration information and the second configuration information to the receive end device, where the first configuration information includes the information used to indicate the first link group. Correspondingly, the receive end device receives the first configuration information sent by the source end device.

Step E-10: The receive end device performs configuration of differential delay compensation, for example, sets a local buffer for differential delay compensation, based on the first configuration information.

Step E-11: The receive end device sends the second configuration information to the intermediate device, where the second configuration information includes information used to indicate a configuration of delayed-sending compensation that the intermediate device needs to perform on a corresponding link. Correspondingly, the intermediate device receives the second configuration information sent by the receive end device.

Step E-12: The receive end device sends the first configuration information to the intermediate device, where the first configuration information includes the information used to indicate the first link group. Correspondingly, the intermediate device receives the first configuration information sent by the source end device. It should be understood that step E-12 is an optional step, and step E-12 may be performed for another process instead of a collaborative compensation process.

Step E-13: The intermediate device adjusts a sending delay of a link, for example, sets a buffer for delayed data sending, based on the second configuration information.

Step E-14: The intermediate device sends, to the receive end device, information about an updated current status of delayed-sending compensation. In this way, preparation can be made for next collaborative compensation, and the receive end device is informed that configuration of delayed-sending compensation is completed.

Step E-15: After receiving the information sent by the intermediate device, the receive end device re-analyzes the differential delay between the links, and performs differential delay compensation on the M links. Further, the receive end device performs differential delay compensation, that is, sets a differential delay buffer size, based on the first configuration information. The receive end device feeds back, to the source end device, information indicating that configuration is completed.

Step E-16: The source end device sends service data to the receive end device based on the first configuration information.

Optionally, in step E-8, the source end device may further determine a link group configuration solution with reference to related information of the service data to be sent to the receive end device, for example, comprehensive factors such as a service volume and/or bandwidth.

It should be understood that, between the source end device, the intermediate device, and the receive end device, a transmission format and transmission channel of at least one of the first status information, the first capability information, the first configuration information, the second status information, the second capability information, or the second configuration information are similar to those in Embodiment 4, and details are not described herein again.

Embodiment 8

In this embodiment, the first device, namely a decision device, is the source end device, and the second device is the receive end device. The receive end device has a delayed-receiving compensation capability. The source end device has a delayed-sending compensation capability, that is, the K upstream devices are the source end device.

Further, the method 100 may further include transmitting, by the first device based on the first link group, service data to the second device based on a determined configuration of delayed-sending compensation that the first device needs to perform on a corresponding link.

Figure 12:
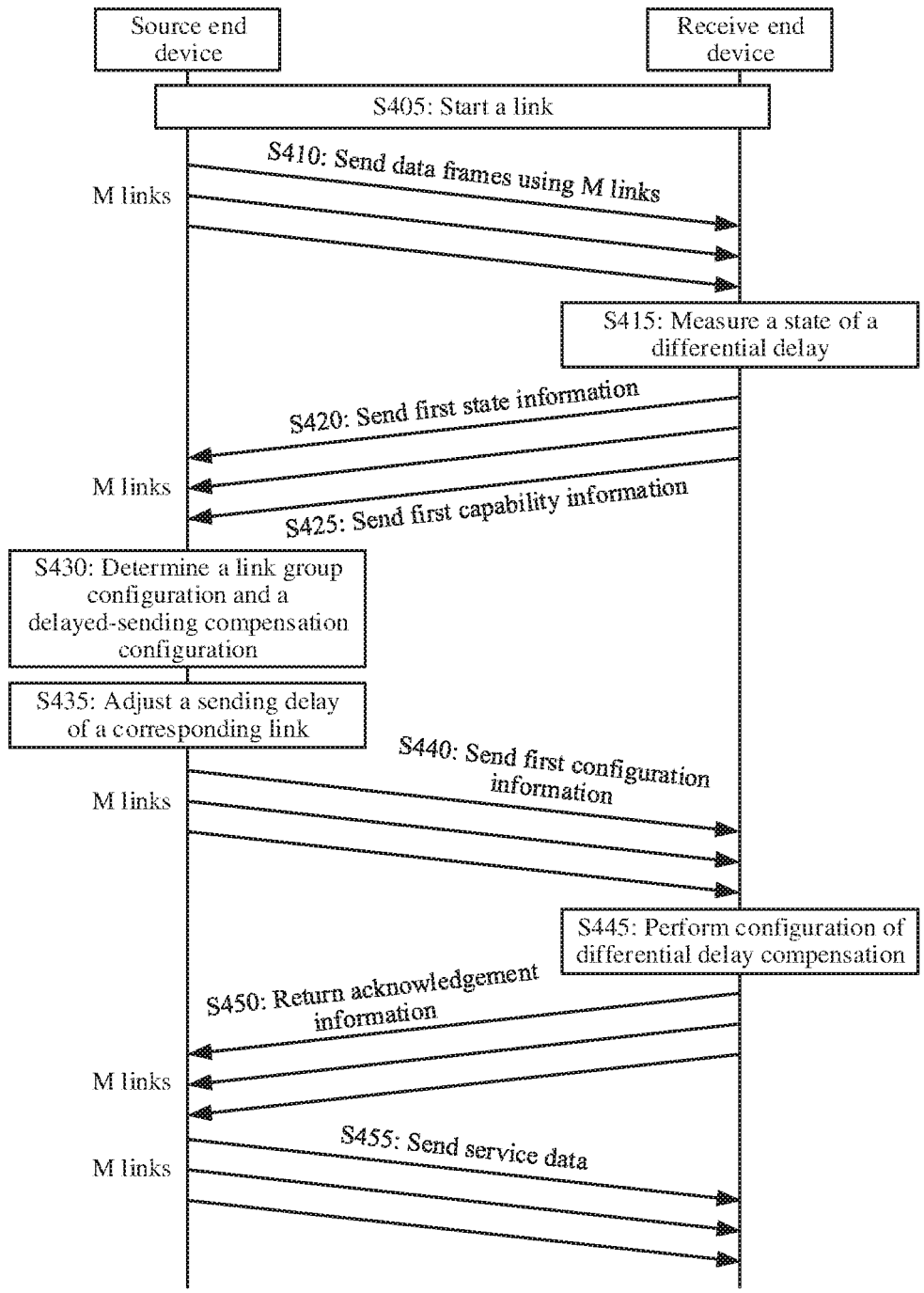
FIG. 12 is a schematic diagram of a process of link group configuration and compensation according to an embodiment of this application.

FIG. 12 is a schematic diagram of a process 400 of link group configuration and compensation according to this embodiment. The process 400 of collaborative compensation by the receive end device and the source end device may include the following steps.

Step S405: Start the link between the source end device and the receive end device.

Step S410: The source end device separately sends data frames to the receive end device using the M links independently. Correspondingly, the receive end device receives the data frames sent by the source end device. It should be understood that the data frames may include an alignment mark.

Step S415: The receive end device measures a status of a differential delay between the M links.

Step S420: The receive end device sends the first status information to the source end device, where the first status information is used to indicate the status of the differential delay between the M links. Correspondingly, the source end device receives the first status information sent by the receive end device. Optionally, the first status information may be transmitted through a shim-to-shim management channel of an OH code block in a FlexE.

Step S425: The receive end device sends the first capability information to the source end device, where the first capability information is used to indicate the first capability of performing differential delay compensation on the M links by the receive end device. Correspondingly, the source end device receives the first capability information sent by the receive end device. Optionally, the first capability information may be transmitted through a shim-to-shim management channel of an OH code block in a FlexE.

Step S430: The source end device determines a link group configuration and a delayed-sending compensation configuration based on the first status information, the first capability information, the second capability information used to indicate a capability of performing delayed-sending compensation on at least one of the M links by the source end device, and the second status information used to indicate a status of delayed-sending compensation performed on the at least one of the M links by the source end device. A specific link group configuration includes grouping the N of the M links into the first link group.

Step S435: The source end device adjusts a sending delay of a corresponding link based on the delayed-sending compensation configuration determined in S430. For example, in S430, delayed-sending compensation of a PHY2 is determined to be performed. In this case, a buffer size of delayed-sending compensation of the PHY2 is adjusted in S435.

Step S440: The source end device sends the first configuration information to the receive end device, where the first configuration information includes the information used to indicate the first link group. Correspondingly, the receive end device receives the first configuration information sent by the source end device.

Step S445: The receive end device performs configuration of differential delay compensation, for example, sets a local buffer for differential delay compensation, based on the first configuration information.

Step S450: The receive end device sends, to the source end device, acknowledgement information indicating that configuration is completed. Correspondingly, the source end device receives the acknowledgement information sent by the receive end device. When the acknowledgement information indicates that the source end device successfully configures delayed-sending compensation, step S455 is performed. When the acknowledgement information indicates that the source end device fails to configure delayed-sending compensation, step S430 is performed again.

Step S455: The source end device sends service data to the receive end device based on the first configuration information.

It should be understood that, between the source end device and the receive end device, a transmission format and transmission channel of at least one of the first status information, the first capability information, the first configuration information, the second status information, the second capability information, or the second configuration information are similar to those in Embodiment 4, and details are not described herein again.

Embodiment 9

In this embodiment, the first device, namely a decision device, is the source end device, and the second device is the receive end device. The receive end device has a delayed-receiving compensation capability. The source end device and at least one intermediate device have a delayed-sending compensation capability. That is, the K upstream devices include the source end device and the at least one intermediate device.

The method 100 may further include transmitting, by the first device based on the first link group, service data to the second device based on a determined configuration of delayed-sending compensation that the first device needs to perform on a corresponding link.

A process of collaborative compensation by the receive end device, the source end device, and the at least one intermediate device may include the following steps.

Step F-1: Start the link between the source end device and the receive end device.

Step F-2: The source end device separately sends data frames to the receive end device using the M links independently. Correspondingly, the receive end device receives the data frames sent by the source end device. It should be understood that the data frames may include an alignment mark.

Step F-3: The receive end device measures a status of a differential delay between the M links.

Step F-4: The receive end device sends the first status information to the source end device, where the first status information is used to indicate the status of the differential delay between the M links. Correspondingly, the source end device receives the first status information sent by the receive end device. Optionally, the first status information may be transmitted through a shim-to-shim management channel of an OH code block in a FlexE.

Step F-5: The receive end device sends the first capability information to the source end device, where the first capability information is used to indicate the first capability of performing differential delay compensation on the M links by the receive end device. Correspondingly, the source end device receives the first capability information sent by the receive end device. Optionally, the first capability information may be transmitted through a shim-to-shim management channel of an OH code block in a FlexE.

Step F-6: The intermediate device sends the second capability information to the source end device, where the second capability information is used to indicate a second capability of performing delayed-sending compensation on at least one of the M links by each intermediate device. Correspondingly, the source end device receives the second capability information sent by the intermediate device. It should be understood that the second capability information may be carried in the data frame in step F-2, or may be sent in another manner. This is not limited in this embodiment. Optionally, the second capability information may be transmitted through a shim-to-shim management channel of an OH code block in a FlexE.

Step F-7: The intermediate device sends the second status information to the source end device, where the second status information is used to indicate a current status of delayed-sending compensation performed on the at least one of the M links by each intermediate device. Correspondingly, the source end device receives the second status information sent by the intermediate device. It should be understood that the second status information may be carried in the data frame in step F-2, or may be sent in another manner. This is not limited in this embodiment. Optionally, the second status information may be transmitted through a section management channel of an OH code block in a FlexE.

Step F-8: The source end device determines a link group configuration and a delayed-sending compensation configuration based on the first status information, the first capability information, the second capability information sent by the intermediate device, the second capability information used to indicate a capability of performing delayed-sending compensation on at least one of the M links by the source end device, the second status information sent by the intermediate device, and the second status information used to indicate a status of delayed-sending compensation performed on the at least one of the M links by the source end device. A specific link group configuration includes grouping the N of the M links into the first link group.

Step F-9: The source end device adjusts a sending delay of a corresponding link based on the delayed-sending compensation configuration determined in step F-8. For example, in step F-8, delayed-sending compensation of a PHY2 is determined to be performed. In this case, a buffer size of delayed-sending compensation of the PHY2 is adjusted in step F-9.

Step F-10: The source end device sends the first configuration information and the second configuration information to the receive end device, where the first configuration information includes the information used to indicate the first link group. Correspondingly, the receive end device receives the first configuration information sent by the source end device.

Step F-11: The receive end device performs configuration of differential delay compensation, for example, sets a local buffer for differential delay compensation, based on the first configuration information.

Step F-12: The receive end device sends the second configuration information to the intermediate device, where the second configuration information includes information used to indicate a configuration of delayed-sending compensation that the intermediate device needs to perform on a corresponding link. Correspondingly, the intermediate device receives the second configuration information sent by the receive end device.

Step F-13: The receive end device sends the first configuration information to the intermediate device, where the first configuration information includes the information used to indicate the first link group. Correspondingly, the intermediate device receives the first configuration information sent by the source end device. It should be understood that step F-13 is an optional step, and step F-13 may be performed for another process instead of a collaborative compensation process.

Step F-14: The intermediate device adjusts a sending delay of a link, for example, sets a buffer for delayed data sending, based on the second configuration information.

Step F-15: The intermediate device sends, to the receive end device, information about an updated current status of delayed-sending compensation. In this way, preparation can be made for next collaborative compensation, and the receive end device is informed that configuration of delayed-sending compensation is completed.

Step F-16: The receive end device performs differential delay compensation on the M links after receiving the information sent by the intermediate device. Further, the receive end device performs differential delay compensation, that is, sets a differential delay buffer size, based on the first configuration information. The receive end device sends, to the source end device, information indicating that configuration is completed.

Step F-17: The source end device sends service data to the receive end device based on the first configuration information.

It should be understood that, between the source end device, the intermediate device, and the receive end device, a transmission format and transmission channel of at least one of the first status information, the first capability information, the first configuration information, the second status information, the second capability information, or the second configuration information are similar to those in Embodiment 4, and details are not described herein again.

In Embodiment 10, the first device, namely a decision device, is a management device, and the second device includes the receive end device and/or the source end device. The receive end device has a delayed-receiving compensation capability. The K upstream devices may include the source end device and/or at least one intermediate device, and have the delayed-sending compensation capability.

Further, in step S110, obtaining, by a first device, first status information of M links between a source end device and a receive end device may include receiving, by the first device, the first status information sent by the receive end device, in step S120, obtaining, by the first device, first capability information of the receive end device may include receiving, by the first device, the first capability information sent by the receive end device, obtaining, by the first device, second capability information and second status information of each of the K upstream devices may include receiving, by the first device, the second capability information and the second status information that are sent by each upstream device, and the method 100 may further include sending, by the first device, second configuration information to at least one of the K upstream devices, where the second configuration information is used to indicate a configuration of delayed-sending compensation that the at least one upstream device needs to perform on a corresponding link.

A process of determining, by the management device, a link group configuration and performing, by the receive end device and another device, collaborative compensation may include the following steps.

Step G-1: Start the link between the source end device and the receive end device.

Step G-2: The source end device separately sends data frames to the receive end device using the M links independently. Correspondingly, the receive end device receives the data frames sent by the source end device. It should be understood that the data frames may include an alignment mark.

Step G-3: The receive end device measures a status of a differential delay between the M links.

Step G-4: The receive end device sends the first status information to the management device, where the first status information is used to indicate the status of the differential delay between the M links. Correspondingly, the management device receives the first status information sent by the receive end device.

Step G-5: The receive end device sends the first capability information to the management device, where the first capability information is used to indicate the first capability of performing differential delay compensation on the M links by the receive end device. Correspondingly, the management device receives the first capability information sent by the receive end device.

Step G-6: The source end device and/or the at least one intermediate device send/sends the second capability information to the management device, where the second capability information is used to indicate the second capability of performing delayed-sending compensation on at least one of the M links by each upstream device. Correspondingly, the management device receives the second capability information sent by the source end device and/or the at least one intermediate device. It should be understood that the second capability information corresponding to the source end device may be carried in the data frame in step G-2, or may be sent in another manner. This is not limited in this embodiment. Optionally, the second capability information may be transmitted through a shim-to-shim management channel of an OH code block in a FlexE.

Step G-7: The source end device and/or the at least one intermediate device send/sends the second status information to the management device, where the second status information is used to indicate the current status of delayed-sending compensation performed on the at least one of the M links by each upstream device. Correspondingly, the management device receives the second status information sent by the source end device and/or the at least one intermediate device. It should be understood that the second status information corresponding to the source end device may be carried in the data frame in step G-2, or may be sent in another manner. This is not limited in this embodiment. Optionally, the second status information may be transmitted through a section management channel of an OH code block in a FlexE.

Step G-8: The management device determines a link group configuration and a delayed-sending compensation configuration based on the first status information, the first capability information, the second status information, and the second capability information. Further, the configuration includes grouping the N of the M links into the first link group.

Step G-9: The management device sends second configuration information to an upstream device that is in the K upstream devices (including the source end device and/or the at least one intermediate device) and that needs to perform configuration of delayed-sending compensation, where the second configuration information is used to indicate a delayed-sending compensation configuration.

Step G-10: The upstream device that is in the K upstream devices (including the source end device and/or the at least one intermediate device) and that needs to perform configuration of delayed-sending compensation configures a delayed-sending compensation buffer size based on the second configuration information.

Step G-11: The upstream device that is in the K upstream devices (including the source end device and/or the at least one intermediate device) and that needs to perform configuration of delayed-sending compensation returns acknowledgement information to the management device to indicate that the second configuration information is received and corresponding configuration is performed. Correspondingly, the management device receives the acknowledgement information returned by the source end device and/or the receive end device. It should be understood that step G-11 is an optional step.

Step G-12: The management device sends the first configuration information and the second configuration information to the receive end device after receiving the acknowledgement information, where the first configuration information includes the information used to indicate the first link group. Correspondingly, the receive end device receives the first configuration information and the second configuration information that are sent by the management device. Optionally, the first configuration information may further include a buffer requirement of each link for differential delay compensation to be performed by the receive end device. The receive end device may directly set a buffer volume of each link based on the buffer requirement.

Step G-13: The receive end device performs corresponding configuration based on the first configuration information and the second configuration information.

Step G-14: The receive end device may return acknowledgement information to the management device, to indicate that the first configuration information and the second configuration information are received and corresponding configuration is performed. Correspondingly, the management device receives the acknowledgement information returned by the receive end device. It should be understood that step G-13 is an optional step.

Step G-15: The management device sends the first configuration information to the source end device after receiving the acknowledgement information returned by the receive end device. It should be understood that step G-15 is an optional step.

Step G-16: The source end device sends service data to the receive end device based on the first configuration information.

It should be understood that communication, between the source end device and the receive end device and the management device, about the first status information, the first capability information, the first configuration information, the second status information, the second capability information, and the second configuration information may be performed through a management channel of an OH code block of the devices and the management device. Optionally, in a FlexO, the foregoing information may be transmitted using a GCC0 byte of the OH code block in a GFP format, an HDLC format, or a PPP format, or using an RES field in a self-defined frame format. In a FlexE, the foregoing information may be transmitted in a form of an IP packet through the management channel of the OH code block. A specific transmission manner is not limited in this embodiment.

In the embodiments of this application, the source end device and the receive end device, or even including the intermediate device and the like, may all have a differential delay compensation capability or a delayed-sending compensation capability. The embodiments of this application are applied to the devices, to implement link group compensation through capability negotiation. When a compensation capability of each device in the FlexE group or the FlexO group between the source end device and the receive end device is insufficient to compensate a differential delay between links, a link group is configured such that the source end device performs cross-link service data transmission only on delay-aligned links.

It should be understood that, in the embodiments of this application, in transmission of any one of the first status information, the first capability information, the second status information, the second capability information, the first configuration information, and the second configuration information, status, capability, or configuration information corresponding to each link may be transmitted on the link, that is, related information is transmitted using a link as a granularity. Certainly, in the embodiments of this application, related information may alternatively be transmitted using another granularity, for example, using a device as a granularity. This is not limited herein.

The foregoing describes the link group configuration method provided in the embodiments of this application. The following describes a link group configuration device provided in the embodiments of this application.

Figure 13:
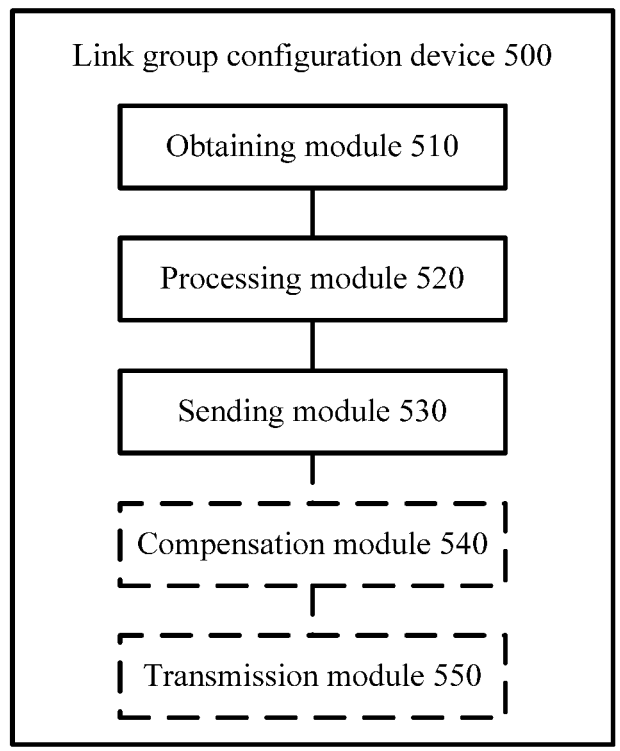
FIG. 13 is a schematic block diagram of a link group configuration device according to an embodiment of this application.

FIG. 13 is a schematic block diagram of a link group configuration device 500 according to an embodiment of this application. The link group configuration device 500 is a first device. As shown in FIG. 13, the link group configuration device 500 may include an obtaining module 510 configured to obtain first status information of M links between a source end device and a receive end device, where the first status information is used to indicate a differential delay between any two of the M links, any one of the M links is a FlexE physical connection link or a FlexO physical connection link, and M is an integer greater than or equal to 2, where the obtaining module 510 is further configured to obtain first capability information of the receive end device, where the first capability information is used to indicate a first capability of performing differential delay compensation on the M links by the receive end device, a processing module 520 configured to group N of the M links into a first link group based on the first status information obtained by the obtaining module 510 and the first capability information obtained by the obtaining module 510, where N is an integer less than or equal to M and greater than or equal to 2, and a sending module 530 configured to send first configuration information to a second device, where the first configuration information includes information used to indicate the first link group.

The link group configuration device in this embodiment of this application groups the N of the M links into the first link group based on a status of a differential delay between the M links between the source end device and the receive end device and the capability of performing differential delay compensation on the M links by the receive end device. This avoids a case in which all of the M links are unavailable when the differential delay between the M links exceeds the differential delay compensation capability of the receive end device. Therefore, availability and robustness of a link in a transport network can be improved.

Optionally, in an optional embodiment, the first device is the receive end device, the second device is the source end device, and the obtaining module 510 is further configured to measure a differential delay between the M links to obtain the first status information, and the device 500 further includes a compensation module 540 configured to perform differential delay compensation on links in the first link group based on the first configuration information, and a transmission module 550 configured to perform service data transmission with the second device based on the first link group.

Optionally, in an optional embodiment, the obtaining module 510 is further configured to receive the first status information sent by the receive end device, and receive the first capability information sent by the receive end device.

Optionally, in an optional embodiment, the first device is the source end device, and the second device is the receive end device, or the first device is a management device, and the second device includes the receive end device and/or the source end device.

Optionally, in an optional embodiment, K upstream devices of the receive end device on the M links have a delayed-sending compensation capability, where K is a positive integer, the K upstream devices include the source end device and/or at least one intermediate device, and the intermediate device is located between the source end device and the receive end device on the M links. The obtaining module 510 is further configured to obtain second capability information and second status information of each of the K upstream devices, where the second capability information is used to indicate a second capability of performing delayed-sending compensation on at least one of the M links by each upstream device, and the second status information is used to indicate a current status of delayed-sending compensation performed on the at least one of the M links by each upstream device. The processing module 520 is further configured to group the N of the M links into the first link group based on the first status information, the first capability information, the second status information, and the second capability information. The processing module 520 is further configured to determine, based on the first status information, the first capability information, the second status information, and the second capability information, a configuration of delayed-sending compensation that each upstream device needs to perform on a corresponding link.

It should be understood that, when the M links cannot be aligned on the receive end device, the M links cannot constitute a link group, to be specific, a FlexE group or a FlexO group crashes and cannot work. The source end device, the receive end device, the intermediate device, and the like in the embodiments of this application may all have a differential delay compensation capability or a delayed-sending compensation capability. The devices in the embodiments of this application implement link group compensation through capability negotiation. When a compensation capability of each device in the FlexE group or the FlexO group between the source end device and the receive end device is insufficient to compensate a differential delay between links, a link group is configured such that the source end device performs cross-link service data transmission only on delay-aligned links. Alternatively, devices perform collaborative compensation such that the M links can be aligned on the receive end device finally. This can ensure working of the FlexE group or the FlexO group, and can improve link utilization.

Optionally, in an optional embodiment, the first device is the receive end device, the second device is the source end device, and the obtaining module 510 is further configured to measure a differential delay between the M links, to obtain the first status information, and receive the second capability information and the second status information that are sent by each upstream device, and sending module 530 is further configured to send second configuration information to at least one of the K upstream devices, where the second configuration information is used to indicate a configuration of delayed-sending compensation that the at least one upstream device needs to perform on a corresponding link.

Optionally, in an optional embodiment, the device 500 may further include a compensation module 540 configured to perform, based on the first configuration information, differential delay compensation on a link, in the first link group, on which the at least one upstream device has performed delayed-sending compensation based on the second configuration information, and a transmission module 550 configured to perform service data transmission with the second device based on the first link group.

Optionally, in an optional embodiment, the first device is the source end device, the second device is the receive end device, and the obtaining module 510 may be further configured to receive the first status information sent by the receive end device, and receive the first capability information sent by the receive end device.

Optionally, in an optional embodiment, the K upstream devices include the first device, and the device 500 may further include a transmission module 550 configured to transmit, based on the first link group, service data to the second device based on a determined configuration of delayed-sending compensation that the first device needs to perform on a corresponding link.

Optionally, in an optional embodiment, the K upstream devices include at least one intermediate device, and the obtaining module 510 is further configured to receive the second capability information and the second status information that are sent by each of the at least one intermediate device, and the sending module 530 is further configured to send second configuration information to at least some of the at least one intermediate device, where the second configuration information is used to indicate a configuration of delayed-sending compensation that the at least some intermediate devices need to perform on a corresponding link.

Optionally, in an optional embodiment, the first device is a management device, the second device includes the receive end device and/or the source end device, and the obtaining module 510 may be further configured to receive the first status information sent by the receive end device, receive the first capability information sent by the receive end device, and receive the second capability information and the second status information that are sent by each upstream device, and the sending module 530 may be further configured to send second configuration information to at least one of the K upstream devices, where the second configuration information is used to indicate a configuration of delayed-sending compensation that the at least one upstream device needs to perform on a corresponding link.

Optionally, in an optional embodiment, the first configuration information includes a mark used to indicate that a link belongs to the first link group.

Optionally, in an optional embodiment, the sending module 530 may be further configured to add the first configuration information to a reserved field of an overhead code block, and send the reserved field to the second device.

Optionally, in an optional embodiment, the sending module 530 may be further configured to send the first configuration information to the second device using a first link of the N links, where the first configuration information is used to indicate that the first link belongs to the first link group.

Optionally, in an optional embodiment, a first part of bits in the first configuration information is used to indicate that the first link and another link constitute the first link group, and a second part of bits in the first configuration information is a mark of the first link group.

Optionally, in an optional embodiment, the obtaining module 510 is further configured to receive the first status information that is sent by the receive end device and that is carried in a first TLV unit in an LLDP format of a management channel of an overhead code block.

Optionally, in an optional embodiment, the first TLV unit can further carry information that is used to indicate a current status of delayed-sending compensation performed on the M links by the receive end device when the receive end device sends service data to the source end device.

Optionally, in an optional embodiment, the first TLV unit can further carry information that is used to indicate a configuration of delayed-sending compensation that an upstream device needs to perform on a corresponding link.

Optionally, in an optional embodiment, the obtaining module 510 is further configured to receive the first capability information that is sent by the receive end device and that is carried in a second TLV unit in an LLDP format of a management channel of an overhead code block.

Optionally, in an optional embodiment, the second TLV unit can further carry information that is used to indicate a capability of performing delayed-sending compensation on the M links by the receive end device when the receive end device sends service data to the source end device.

It should be understood that some functions of the obtaining module 510 in this embodiment of this application may be implemented by a processor or a related circuit component of a processor, some functions of the obtaining module 510 may be implemented by a network interface or a related circuit component of a network interface, the processing module 520 may be implemented by a processor or a related circuit component of a processor, and the sending module 530 may be implemented by a network interface or a related circuit component of a network interface.

Figure 14:
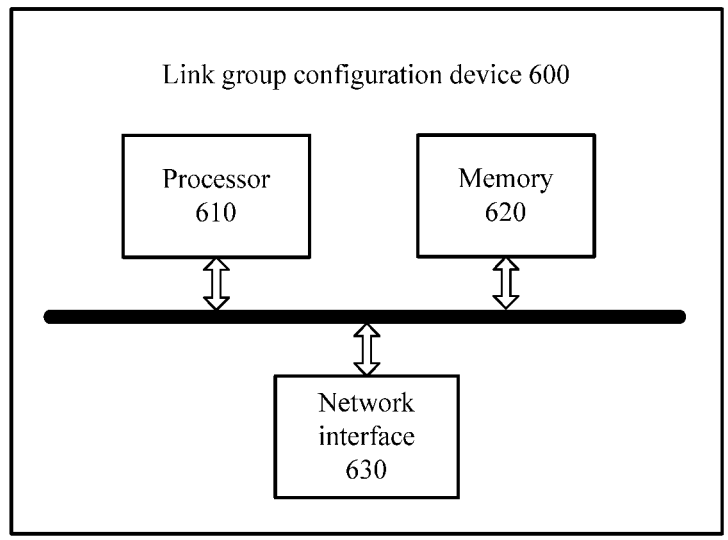
FIG. 14 is a schematic block diagram of a link group configuration device according to another embodiment of this application.

As shown in FIG. 14, an embodiment of this application further provides a link group configuration device 600. The link group configuration device 600 is a first device. The link group configuration device 600 includes a processor 610, a memory 620, and a network interface 630. The memory 620 is configured to store an instruction. The processor 610 and the network interface 630 are configured to execute the instruction stored in the memory 620.

When the processor 610 and the network interface 630 of the link group configuration device 600 execute the instruction stored in the memory 620, the following are implemented, Obtaining, by the first device, first status information of M links between a source end device and a receive end device, where the first status information is used to indicate a status of a differential delay between any two of the M links, any one of the M links is a FlexE physical connection link or a FlexO physical connection link, and M is an integer greater than or equal to 2, obtaining, by the first device, first capability information of the receive end device, where the first capability information is used to indicate a first capability of performing differential delay compensation on the M links by the receive end device, grouping, by the first device, N of the M links into a first link group based on the first status information and the first capability information, where N is an integer less than or equal to M and greater than or equal to 2, and sending, by the first device, first configuration information to a second device, where the first configuration information includes information used to indicate the first link group.

The link group configuration device in this embodiment of this application groups the N of the M links into the first link group based on a status of a differential delay between the M links between the source end device and the receive end device and the capability of performing differential delay compensation on the M links by the receive end device. This avoids a case in which all of the M links are unavailable when the differential delay between the M links exceeds the differential delay compensation capability of the receive end device. Therefore, availability and robustness of a link in a transport network can be improved.

It should be understood that the link group configuration device 500 shown in FIG. 13 or the link group configuration device 600 shown in FIG. 14 may be configured to perform an operation or a process related to a terminal device in the foregoing method embodiments. In addition, an operation and/or a function of each module in the link group configuration device 500 or the link group configuration device 600 are/is for implementing a corresponding process in the foregoing method embodiments. For brevity, details are not described herein again.

It should be understood that the processor in the embodiments of the present disclosure may be a central processing unit (CPU), or may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

It should be further understood that the memory in the embodiments of the present disclosure may be a volatile memory or a nonvolatile memory, or may include both a volatile memory and a nonvolatile memory. The nonvolatile memory may be a read-only memory (ROM), a programmable ROM (PROM), an erasable PROM (EPROM), an electrically EPROM (EEPROM), or a flash memory. The volatile memory may be a random access memory (RAM), and is used as an external cache. Through illustrative rather than limitative descriptions, a plurality of forms of RAMs can be used, for example, a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct memory bus RAM (DR RAM).

It should be understood that, when the processor is the general purpose processor, the DSP, the ASIC, the FPGA or another programmable logic device, the discrete gate or transistor logic device, or the discrete hardware component, the memory (a storage module) is integrated into the processor.

It should be noted that the memory described in this specification is to include, but not limited to, these memories and any other appropriate type of memory.

An embodiment of the present disclosure further provides a computer readable storage medium. The computer readable storage medium stores an instruction. When the instruction is executed on a computer, the computer executes the link group configuration method in the foregoing method embodiments. Further, the computer may be the foregoing link group configuration device, that is, the first device.

An embodiment of the present disclosure further provides a computer program product including an instruction. When a computer executes the instruction of the computer program product, the computer executes the link group configuration method in the foregoing method embodiments. Further, the computer program product may run on the foregoing link group configuration device, that is, the first device.

All or some of the foregoing embodiments may be implemented using software, hardware, firmware, or any combination thereof. When software is used to implement the embodiments, the embodiments may be implemented completely or partly in a form of a computer program product. The computer program product includes one or more computer instructions. When the computer instruction is loaded and executed on a computer, all or some of the processes or functions according to the embodiments of this application are generated. The computer may be a general-purpose computer, a dedicated computer, a computer network, or another programmable apparatus. The computer instruction may be stored in a computer readable storage medium, or may be transmitted from a computer readable storage medium to another computer readable storage medium. For example, the computer instruction may be transmitted from a website, a computer, a server, or a data center to another website, another computer, another server, or another data center in a wired (for example, a coaxial cable, an optical fiber, or a digital subscriber line (DSL)) or wireless (for example, infrared, radio, or microwave) manner. The computer readable storage medium may be any usable medium that can be accessed by the computer, or may be a data storage device, such as a server or a data center, into which one or more usable media are integrated. The usable medium may be a magnetic medium (for example, a FLOPPY DISK, a hard disk, or a magnetic tape), an optical medium (for example, a high-density digital versatile disc (DVD)), a semiconductor medium (for example, a solid-state drive (SSD)), or the like.

It should be understood that "first", "second", and various numbers in this specification are merely intended for differentiation for ease of description, but are not intended for limiting the scope of this application.

It should be understood that the term "and/or" in this specification is merely an associative relationship for describing associated objects, and indicates that three relationships may exist. For example, A and/or B may indicate the following three cases: A alone exists, both A and B exist, and B alone exists. In addition, the character "/" in this specification usually indicates that there is an "or" relationship between former and latter associated objects.

It should be understood that, in the embodiments of this application, sequence numbers of the foregoing processes do not indicate an execution sequence. An execution sequence of the processes should be determined based on functions and internal logic of the processes, but should not constitute any limitation on implementation processes of the embodiments of the present disclosure.

A person of ordinary skill in the art may be aware that units and algorithm steps in examples described with reference to the embodiments disclosed in this specification can be implemented by electronic hardware or a combination of computer software and electronic hardware. Whether the functions are performed by hardware or software depends on specific applications and design constraint conditions of the technical solutions. A person skilled in the art may use different methods to implement the described functions for each specific application, but it should not be considered that such an implementation goes beyond the scope of this application.

It can be clearly understood by a person skilled in the art that, for ease and brevity of description, for detailed working processes of the foregoing systems, apparatuses, and units, reference may be made to corresponding processes in the foregoing method embodiments, and details are not described herein again.

In the several embodiments provided in this application, it should be understood that the disclosed systems, apparatuses, and methods may be implemented in other manners. For example, the described apparatus embodiment is merely an example. For example, the unit division is merely logical function division and may be other division in actual implementation. For example, a plurality of units or components may be combined or may be integrated into another system, or some features may be ignored or not performed. In addition, the displayed or discussed mutual couplings, direct couplings, or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on an actual requirement, to achieve the objectives of the solutions in the embodiments.

In addition, functional units in the embodiments of this application may be integrated into one processing unit, or each of the units may exist alone physically, or two or more units may be integrated into one unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A link group configuration method, implemented by a first device comprising:
   obtaining first status information of M links between a source end device and a receive end device, wherein the first status information indicates a status of a differential delay between two links of the M links, wherein each of the M links is either a flexible Ethernet (FlexE) physical connection link or a flexible optical transport network (FlexO) physical connection link, and wherein M is an integer greater than or equal to two;
   obtaining first capability information of the receive end device, wherein the first capability information indicates a first capability of performing differential delay compensation on the M links by the receive end device;
   grouping N links of the M links into a first link group based on the first status information and the first capability information, wherein N is an integer less than or equal to M and greater than or equal to two; and
   sending first configuration information to a second device, wherein the first configuration information comprises information indicating the first link group.

2. The link group configuration method of claim 1, wherein the first device is the receive end device, wherein the second device is the source end device, and wherein the link group configuration method further comprises:
   measuring a differential delay among the M links to obtain the first status information;
   performing differential delay compensation on the N links based on the first configuration information; and
   performing service data transmission with the second device based on the first link group.

3. The link group configuration of claim 1, wherein K upstream devices of the receive end device on the M links have a delayed-sending compensation capability, wherein K is a positive integer, wherein the K upstream devices comprise the source end device or an intermediate device, wherein the intermediate device is located between the source end device and the receive end device on the M links, wherein the link group configuration method further comprises obtaining second capability information and second status information of each of the K upstream devices, wherein the second capability information indicates a second capability of performing a delayed-sending compensation on a link of the M links by each of the K upstream devices, wherein the second status information indicates a current status of the delayed-sending compensation performed on the link of the M links by each of the K upstream devices, wherein grouping the N links comprises grouping the N links into the first link group based on the first status information, the first capability information, the second status information, and the second capability information, and wherein the link group configuration method further comprises determining, based on the first status information, the first capability information, the second status information, and the second capability information, a configuration of the delayed-sending compensation that each of the K upstream devices needs to perform on a corresponding link.

4. The link group configuration method of claim 1, wherein sending the first configuration information comprises sending the first configuration information to the second device using a first link of the N links, and wherein the first configuration information indicates that the first link belongs to the first link group.

5. The link group configuration method of claim 4, wherein a first part of bits in the first configuration information indicates that the first link and another link constitute the first link group, and wherein a second part of bits in the first configuration information is a mark of the first link group.

6. The link group configuration method of claim 1, wherein obtaining the first status information comprises receiving, from the receive end device, the first status information that is carried in a first type-length-value (TLV) unit in a link layer discovery protocol (LLDP) format of a management channel of an overhead code block.

7. The link group configuration method of claim 6, wherein the first TLV unit is further capable of carrying information indicating a current status of a delayed-sending compensation performed on the M links by the receive end device when the receive end device sends service data to the source end device.

8. The link group configuration method of claim 6, wherein the first TLV unit is further capable of carrying information indicating a configuration of a delayed-sending compensation that an upstream device needs to perform on a corresponding link.

9. The link group configuration method of claim 1, wherein obtaining the first capability information comprising receiving, from the receive end device, the first capability information that is carried in a second type-length-value (TLV) unit in a link layer discovery protocol (LLDP) format of a management channel of an overhead code block.

10. The link group configuration method of claim 9, wherein the second TLV unit is further capable of carrying information indicating a capability of performing a delayed-sending compensation on the M links by the receive end device when the receive end device sends service data to the source end device.

11. A first device comprising:
    a receiver configured to:
       obtain first status information of M links between a source end device and a receive end device, wherein the first status information indicates a status of a differential delay between two of the M links, wherein each of the M links is either a flexible Ethernet (FlexE) physical connection link or a flexible optical transport network (FlexO) physical connection link, and wherein M is an integer greater than or equal to two; and
       obtain first capability information of the receive end device, wherein the first capability information indicates a first capability of performing differential delay compensation on the M links by the receive end device;
    a processor coupled to the receiver and configured to group N links of the M links into a first link group based on the first status information and the first capability information, wherein N is an integer less than or equal to M and greater than or equal to two; and
    a transmitter coupled to the processor and configured to send first configuration information to a second device, wherein the first configuration information comprises information indicating the first link group.

12. The first device of claim 11, wherein the first device is the receive end device, wherein the second device is the source end device, wherein the receiver is further configured to measure a differential delay among the M links to obtain the first status information, wherein the processor is further configured to perform differential delay compensation on the N links based on the first configuration information, and wherein the transmitter is further configured to perform service data transmission with the second device based on the first link group.

13. The first device of claim 11, wherein K upstream devices of the receive end device on the M links have a delayed-sending compensation capability, wherein K is a positive integer, wherein the K upstream devices comprise the source end device or an intermediate device, wherein the intermediate device is located between the source end device and the receive end device on the M links, wherein the receiver is further configured to obtain second capability information and second status information of each of the K upstream devices, wherein the second capability information indicates a second capability of performing a delayed-sending compensation on a link of the M links by each of the K upstream devices, wherein the second status information indicates a current status of the delayed-sending compensation performed on the link of the M links by each of the K upstream devices, and wherein the processor is further configured to:
- group the N links into the first link group based on the first status information, the first capability information, the second status information, and the second capability information; and
- determine, based on the first status information, the first capability information, the second status information, and the second capability information, a configuration of the delayed-sending compensation that each of the K upstream devices needs to perform on a corresponding link.

14. The first device of claim 11, wherein the transmitter is further configured to send the first configuration information to the second device using a first link of the N links, and wherein the first configuration information indicates that the first link belongs to the first link group.

15. The first device of claim 14, wherein a first part of bits in the first configuration information indicates that the first link and another link constitute the first link group, and wherein a second part of bits in the first configuration information is a mark of the first link group.

16. The first device of claim 11, wherein the receiver is further configured to receive, from the receive end device, the first status information that is carried in a first type-length-value (TLV) unit in a link layer discovery protocol (LLDP) format of a management channel of an overhead code block.

17. The first device of claim 16, wherein the first TLV unit is further capable of carrying information indicating a current status of delayed-sending compensation performed on the M links by the receive end device when the receive end device sends service data to the source end device.

18. The first device of claim 16, wherein the first TLV unit is further capable of carrying information indicating a configuration of a delayed-sending compensation that an upstream device needs to perform on a corresponding link.

19. The first device of claim 11, wherein the receiver is further configured to receive, from the receive end device, the first capability information that is carried in a second type-length-value (TLV) unit in a link layer discovery protocol (LLDP) format of a management channel of an overhead code block.

20. The first device of claim 19, wherein the second TLV unit is further capable of carrying information indicating a capability of performing, a delayed-sending compensation on the M links by the receive end device when the receive end device sends service data to the source end device.

* * * * *

UNITED STATES PATENT AND TRADEMARK OFFICE
CERTIFICATE OF CORRECTION

PATENT NO. : 11,082,332 B2
APPLICATION NO. : 16/665675
DATED : August 3, 2021
INVENTOR(S) : Mei et al.

It is certified that error appears in the above-identified patent and that said Letters Patent is hereby corrected as shown below:

In the Claims

Claim 20, Column 52, Line 29: "of performing, a delayed-sending" should read "of performing a delayed-sending"

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*